(12) United States Patent  (10) Patent No.: US 7,822,795 B2
Sangal et al. (45) Date of Patent: Oct. 26, 2010

(54) APPARATUS AND METHODS FOR DISPLAYING AND DETERMINING DEPENDENCY RELATIONSHIPS AMONG SUBSYSTEMS IN A COMPUTER SOFTWARE SYSTEM

(75) Inventors: Neeraj Sangal, Andover, MA (US); Francis A. Waldman, Stoneham, MA (US); Carl D. Parisi, Chelmsford, MA (US); Stephen C. Brennan, Stoneham, MA (US)

(73) Assignee: Lattix, Inc., Andover, MA (US)

( * ) Notice: Subject to any disclaimer, the term of this patent is extended or adjusted under 35 U.S.C. 154(b) by 338 days.

(21) Appl. No.: 12/017,196

(22) Filed: Jan. 21, 2008

(65) Prior Publication Data

US 2008/0189308 A1    Aug. 7, 2008

Related U.S. Application Data

(63) Continuation-in-part of application No. 10/941,618, filed on Sep. 15, 2004, now Pat. No. 7,512,929.

(60) Provisional application No. 61/018,849, filed on Jan. 3, 2008, provisional application No. 60/886,791, filed on Jan. 26, 2007, provisional application No. 60/504,401, filed on Sep. 19, 2003, provisional application No. 60/605,923, filed on Aug. 31, 2004.

(51) Int. Cl.
*G06F 17/30* (2006.01)
(52) U.S. Cl. .................... 707/970; 707/797; 707/829
(58) Field of Classification Search ............ 707/797, 707/829, 972, 970, 999.1, 999.102
See application file for complete search history.

(56) References Cited

U.S. PATENT DOCUMENTS

| 5,600,832 | A  | * | 2/1997  | Eisenberg et al. ............... 1/1 |
| 6,438,591 | B1 | * | 8/2002  | Fehskens et al. ............ 709/223 |
| 7,330,822 | B1 | * | 2/2008  | Robson et al. ................ 705/9 |
| 2002/0170042 | A1 | * | 11/2002 | Do et al. .................... 717/143 |
| 2004/0034662 | A1 | * | 2/2004  | Austin et al. .............. 707/104.1 |
| 2004/0083222 | A1 | * | 4/2004  | Pecherer .................... 707/100 |
| 2004/0233232 | A1 | * | 11/2004 | Iborra et al. ................ 345/700 |
| 2005/0044530 | A1 | * | 2/2005  | Novik ........................ 717/122 |
| 2005/0262191 | A1 | * | 11/2005 | Mamou et al. .............. 709/203 |

* cited by examiner

*Primary Examiner*—Leslie Wong
(74) *Attorney, Agent, or Firm*—Sunstein Kann Murphy & Timbers LLP

(57) ABSTRACT

A method is provided for managing, in a computer system, design of a database system having a set of schemata. The method includes, in a first computer process, extracting dependencies from the database system and identifying the set of schemata. The method further includes, for each specific schema in the set of schemata, creating in a second computer process a partition that, in turn, contains a further partition for each element of the specific schema, so as to establish a hierarchy of partitions in accordance with the structure of the set of schemata. The method also includes storing a representation of the database system including subsystems, dependency relationships among the subsystems, and the hierarchy of partitions. Finally, the method includes providing a graphical output from the computer system, based on the stored representation, in which appears a display of the subsystems in a hierarchy of partitions within a dependency structure matrix, such matrix graphically indicating the dependency relationships among subsystems. Related apparatus and computer products are also provided.

12 Claims, 27 Drawing Sheets

LDM Block Diagram (Prior Art)

(Prior Art)

(Prior Art)

FIG. 3A (Prior Art)

(Prior Art)

(Prior Art)

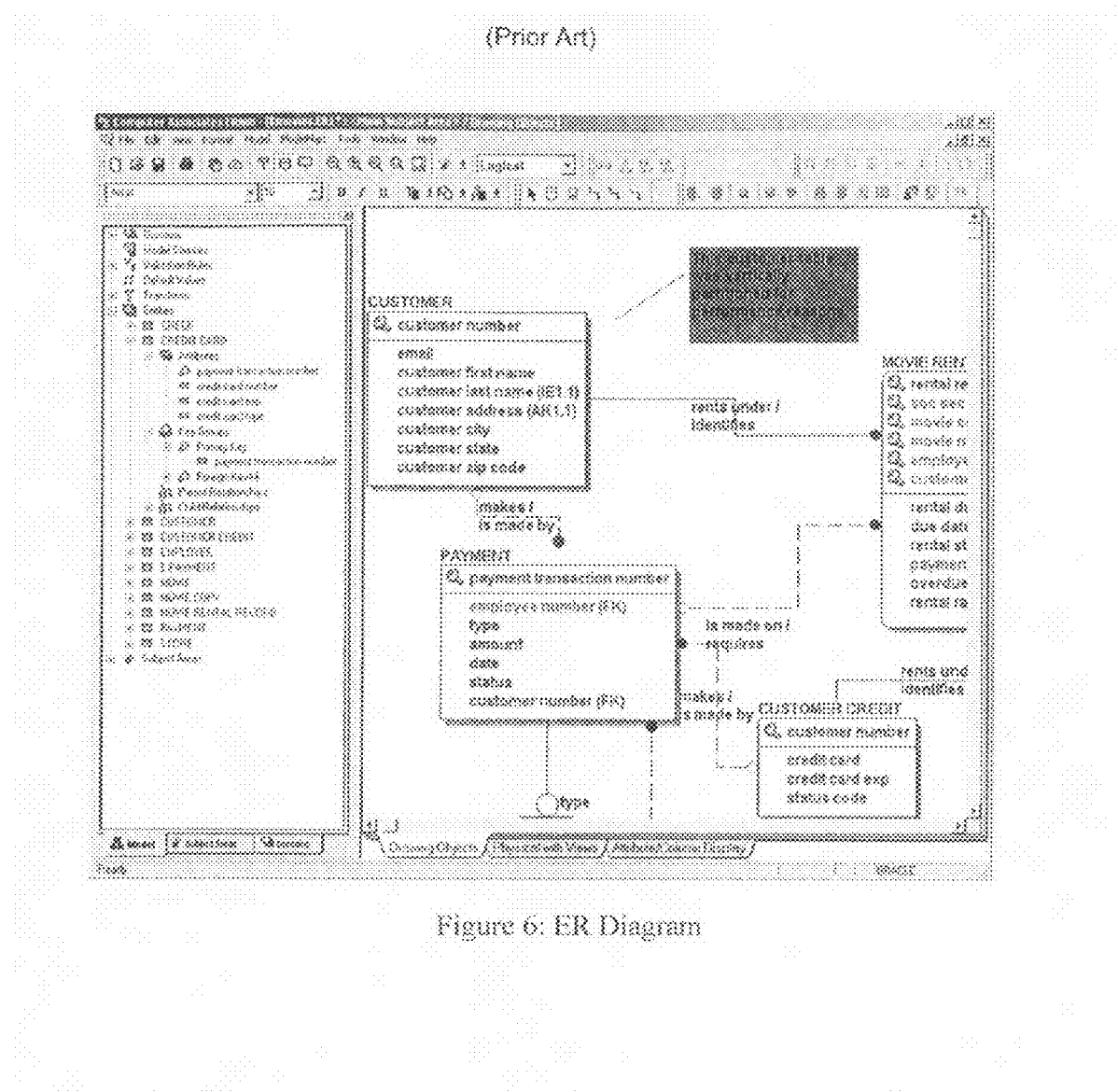
Figure 6: ER Diagram

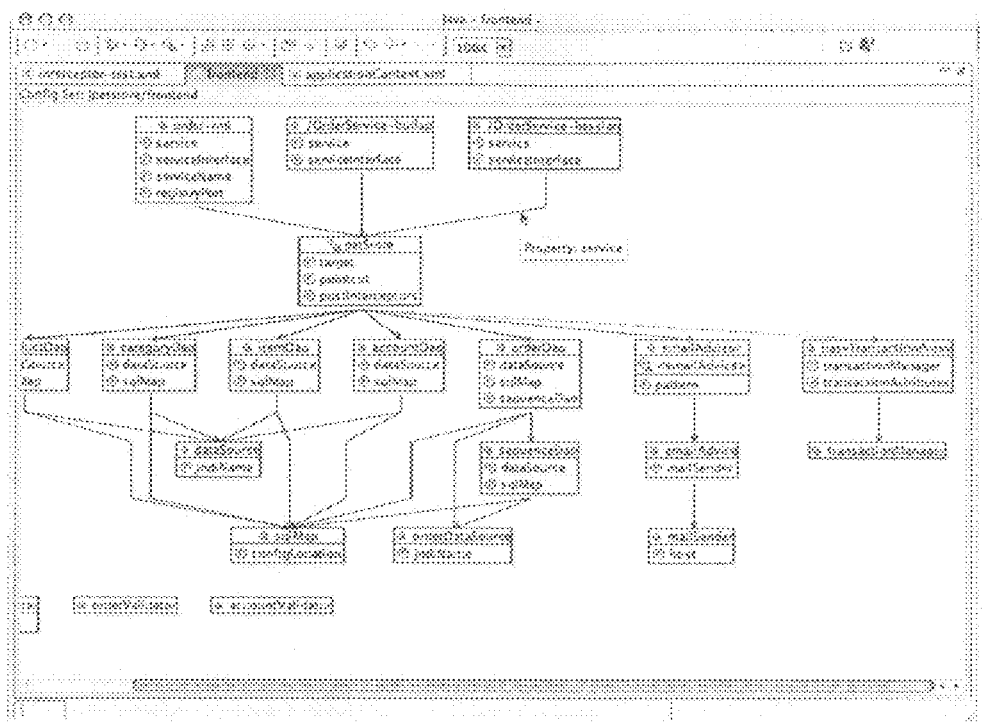
Figure 7: Visualizing Spring Beans

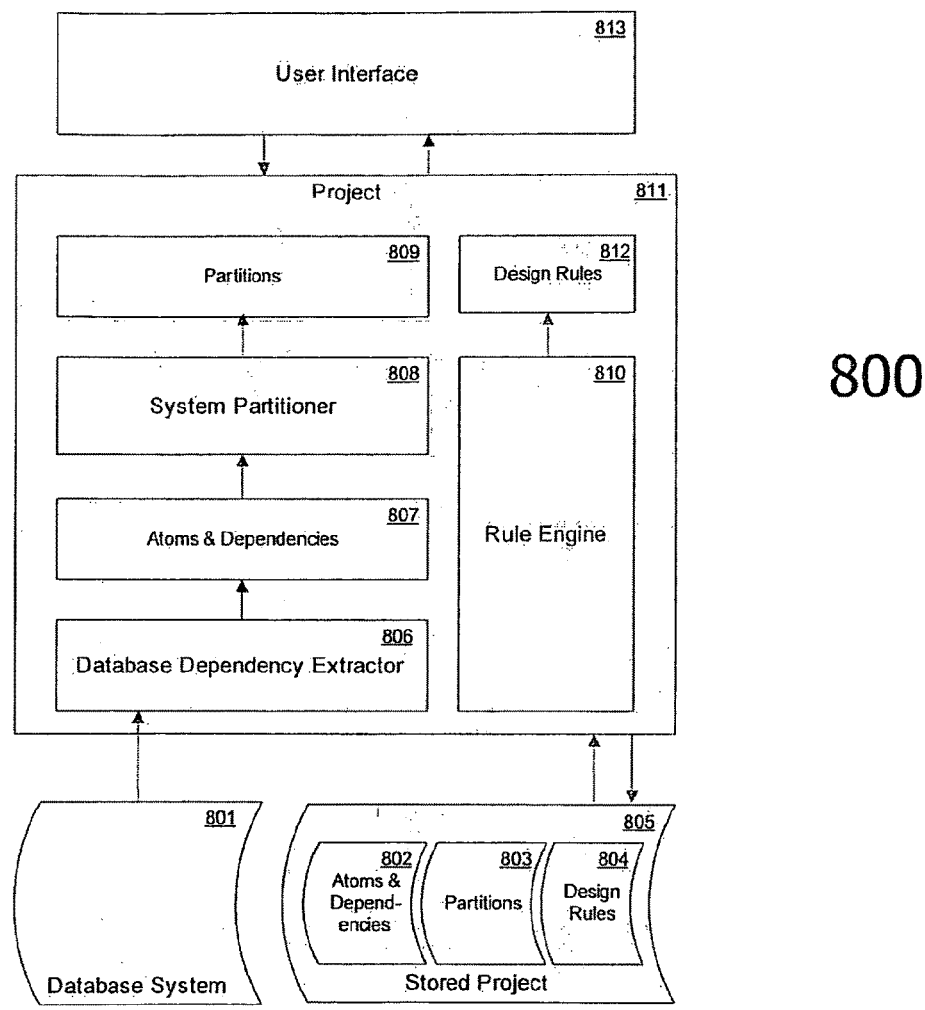
Figure 8: LDM Block Diagram

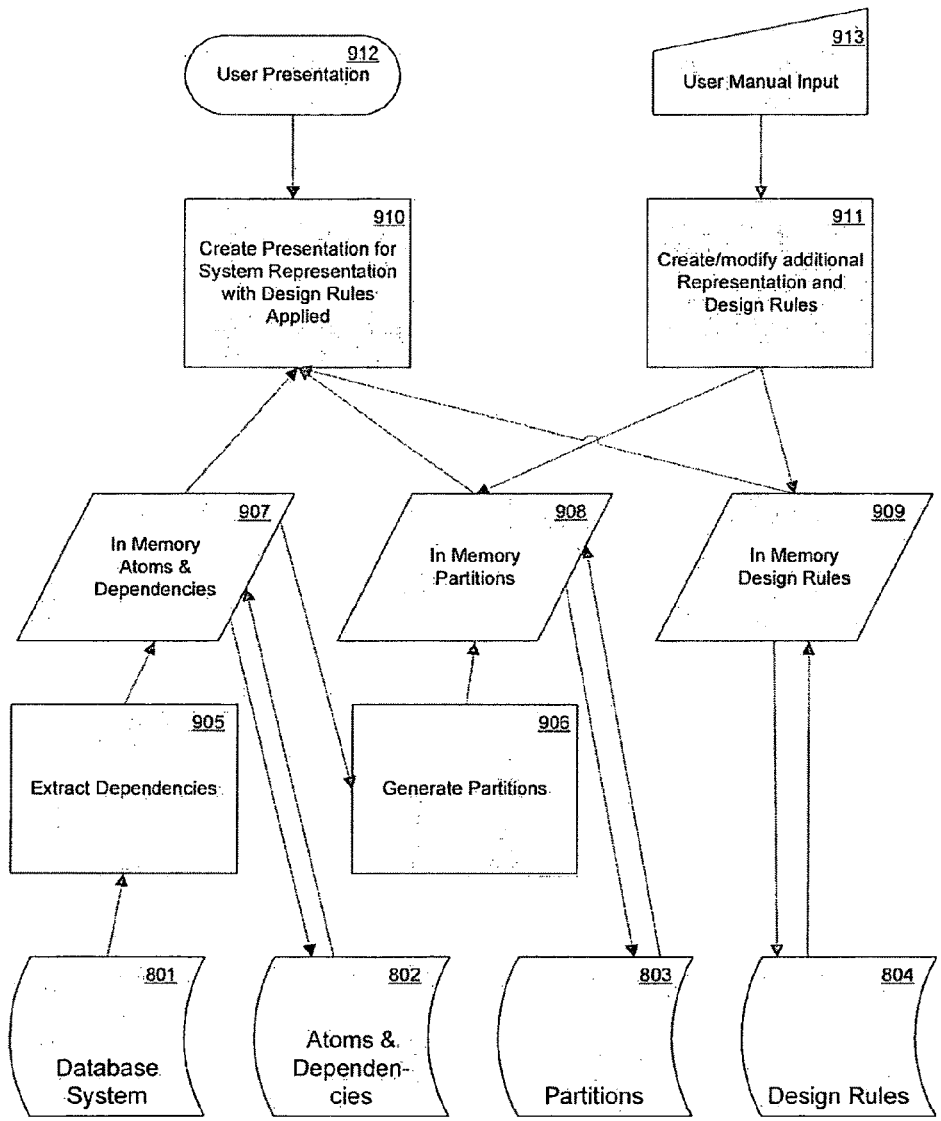
Figure 9: LDM Flow Chart

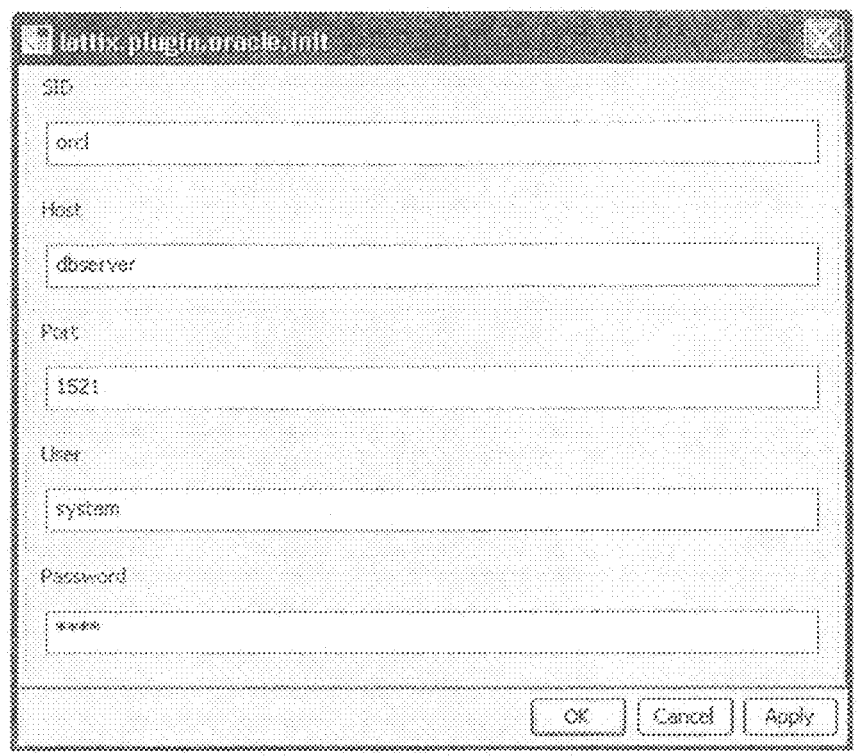
Figure 10: Oracle Connect Dialog

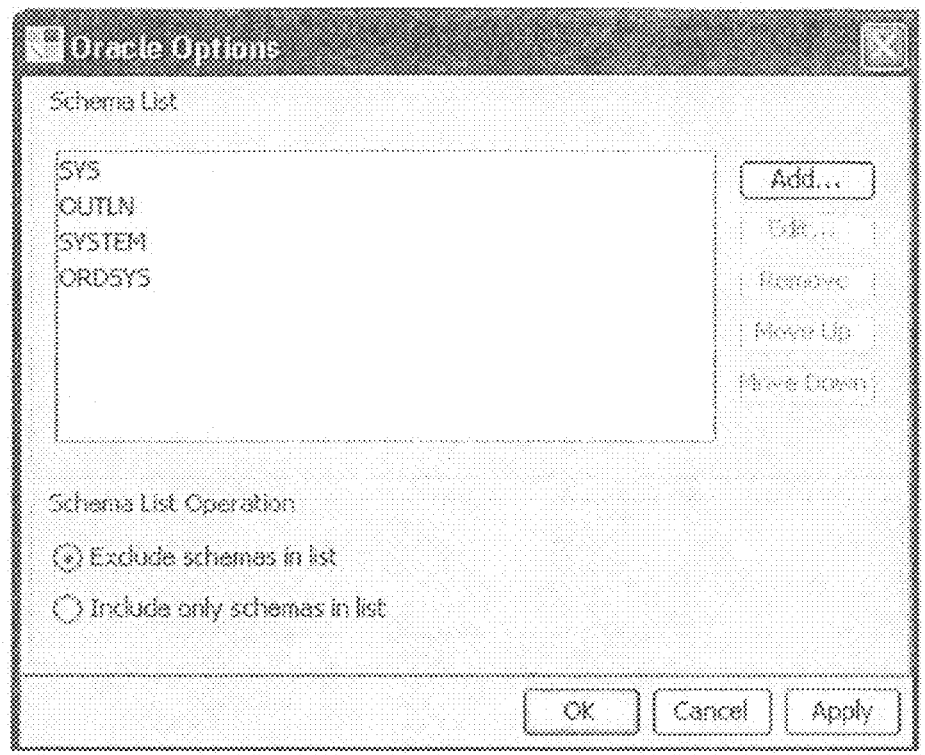
Figure 11: Oracle Options Dialog

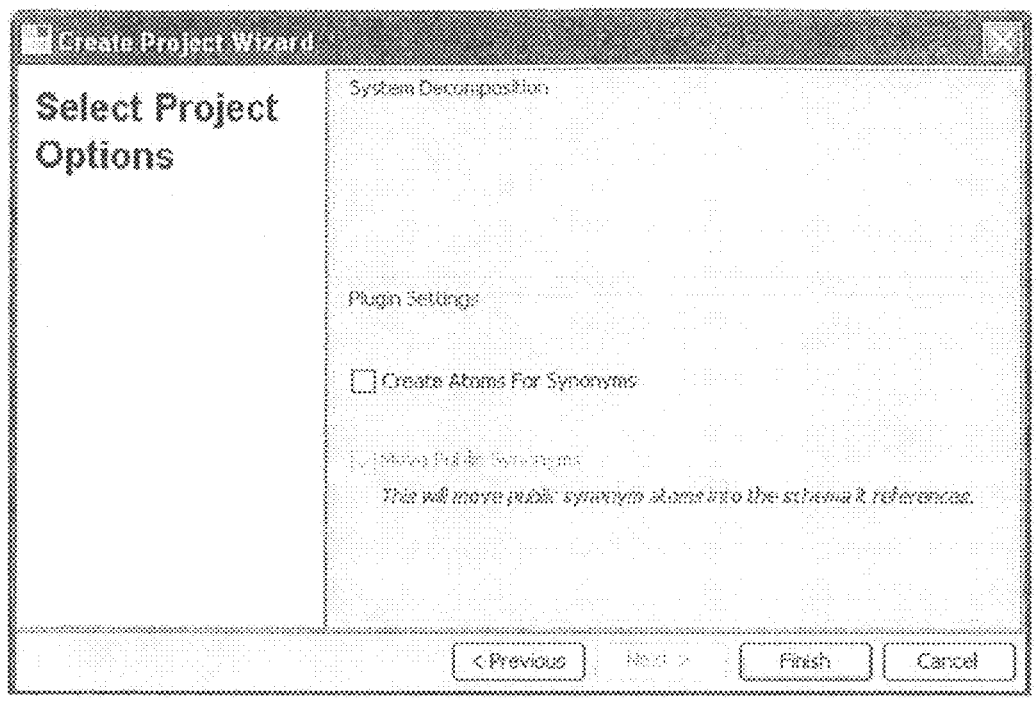
Figure 12: Options for Synonym

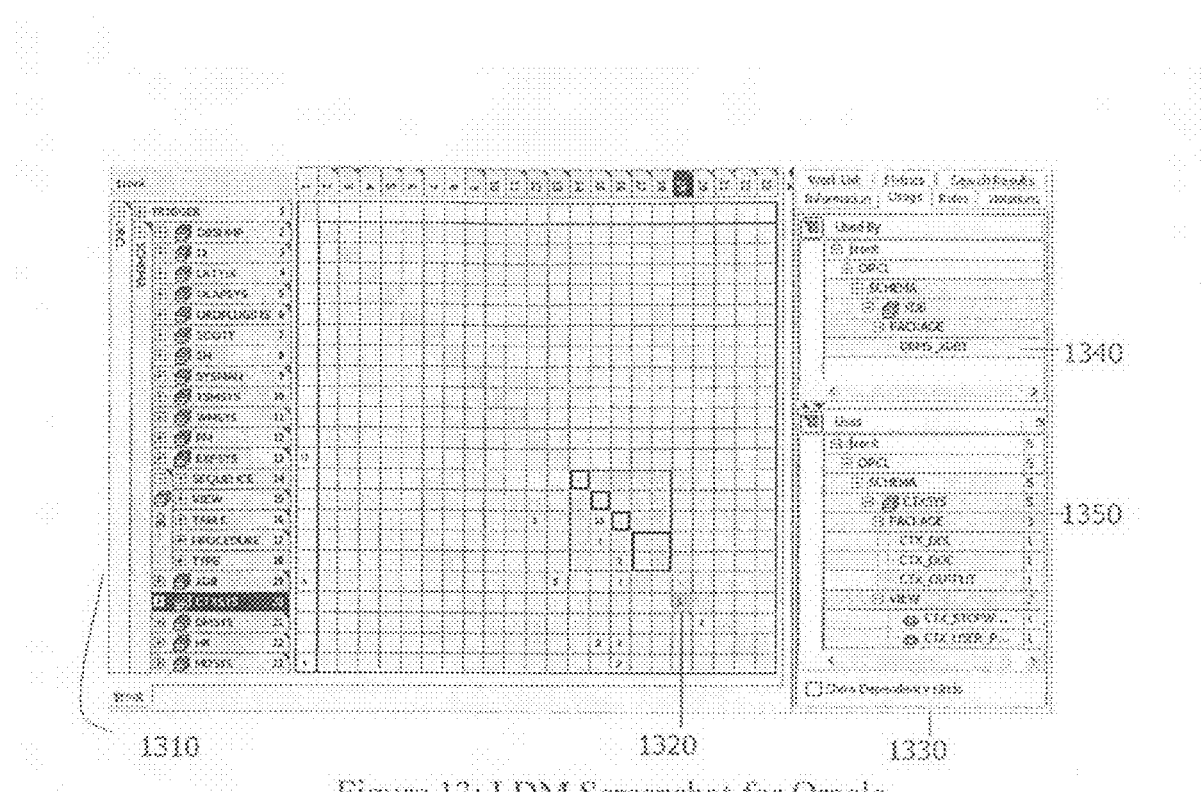
Figure 13: LDM Screenshot for Oracle

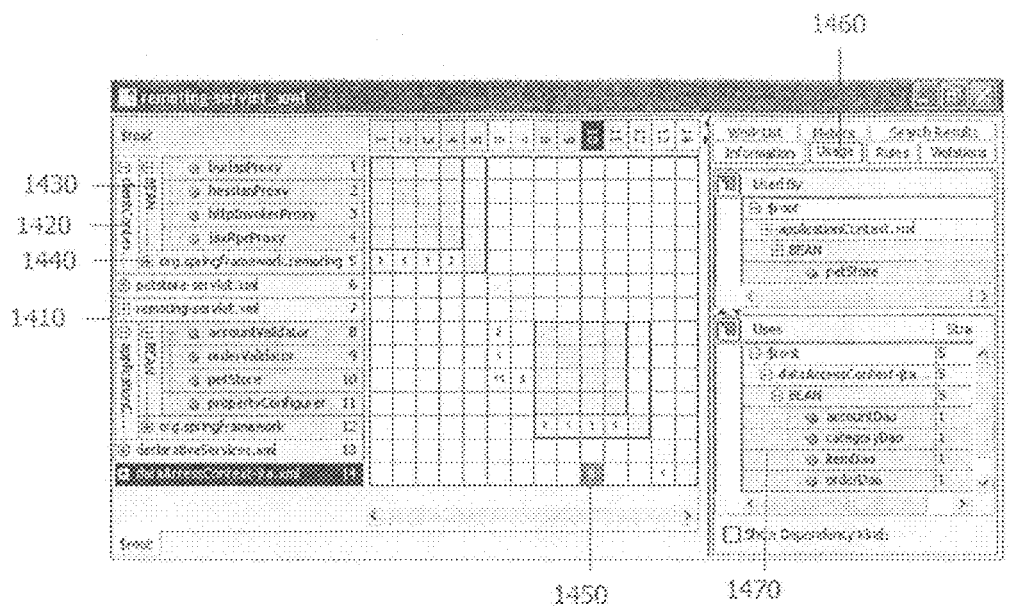
Figure 14: LDM Screenshot for Spring Application

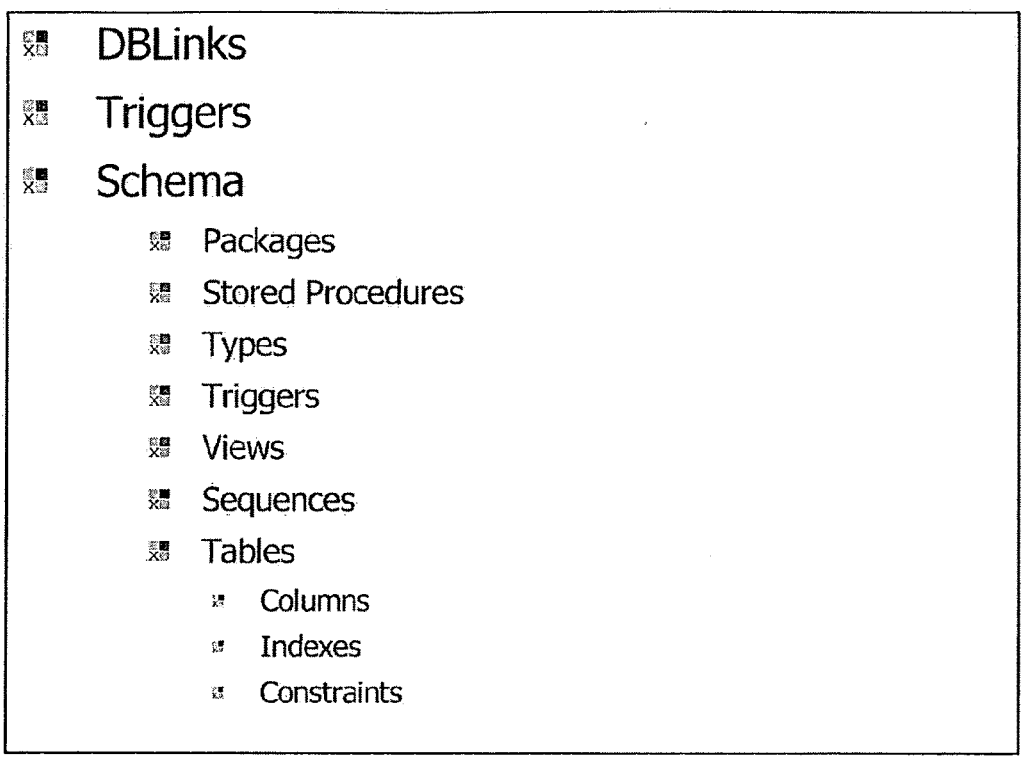
Figure 15: Database Decomposition Hierarchy

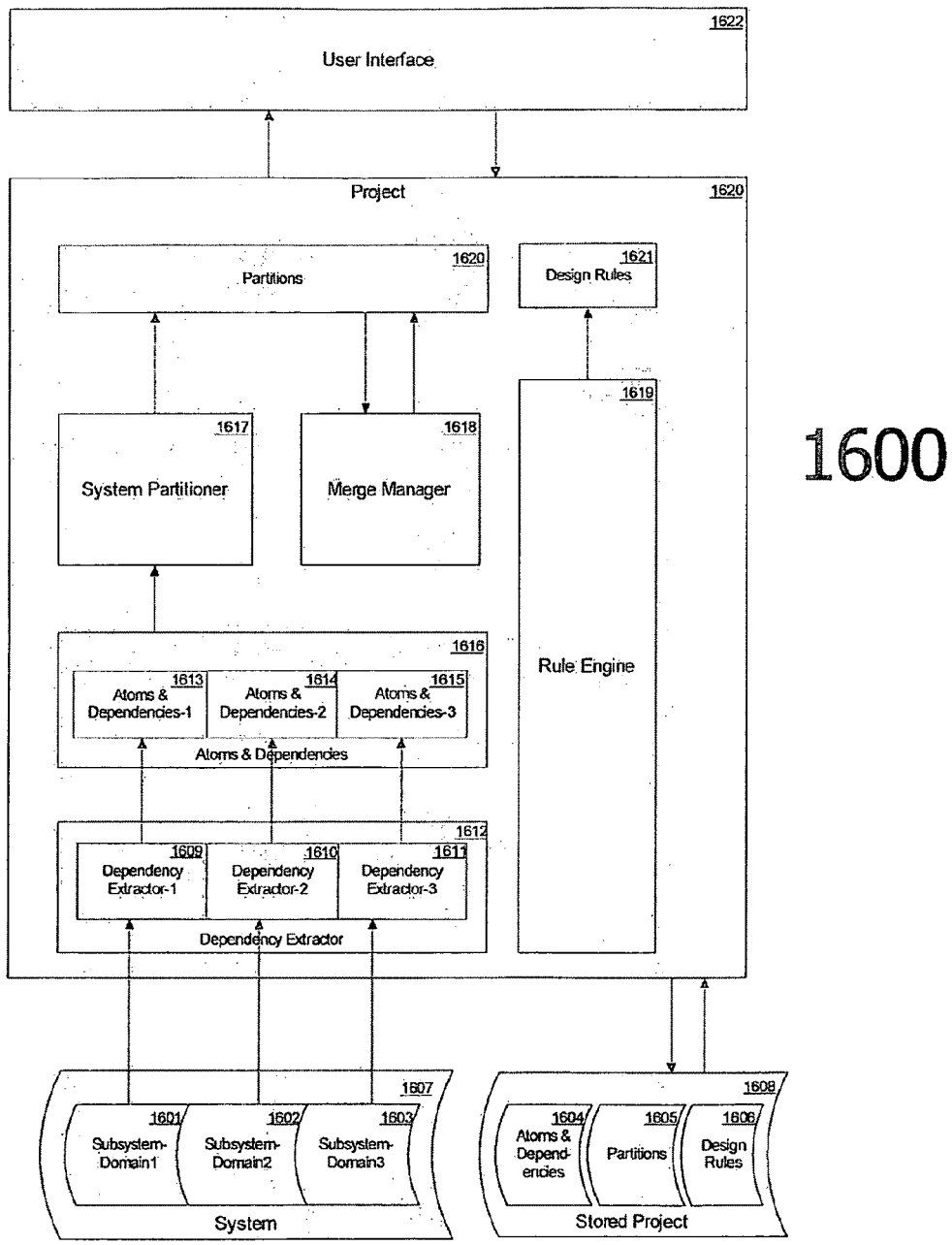
Figure 16: Multi-LDM Block Diagram

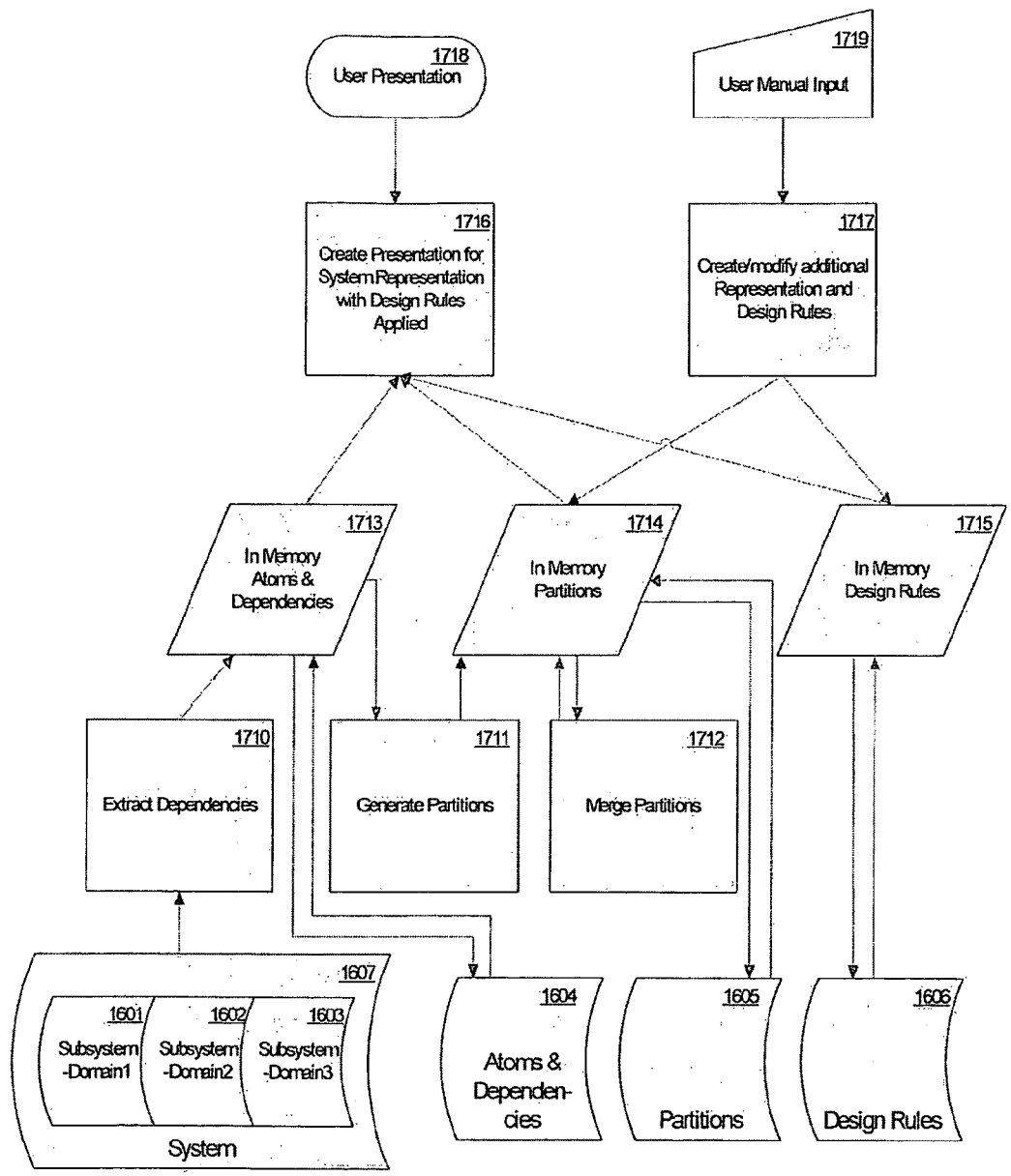
Figure 17: Multi-LDM Flow Chart

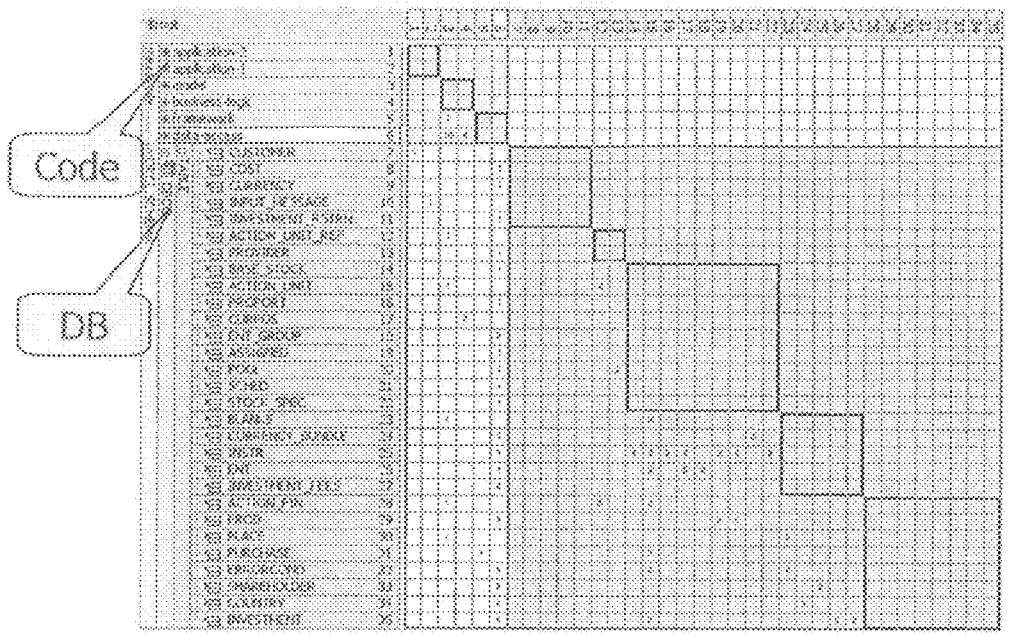
Figure 18: Multi-Domain LDM

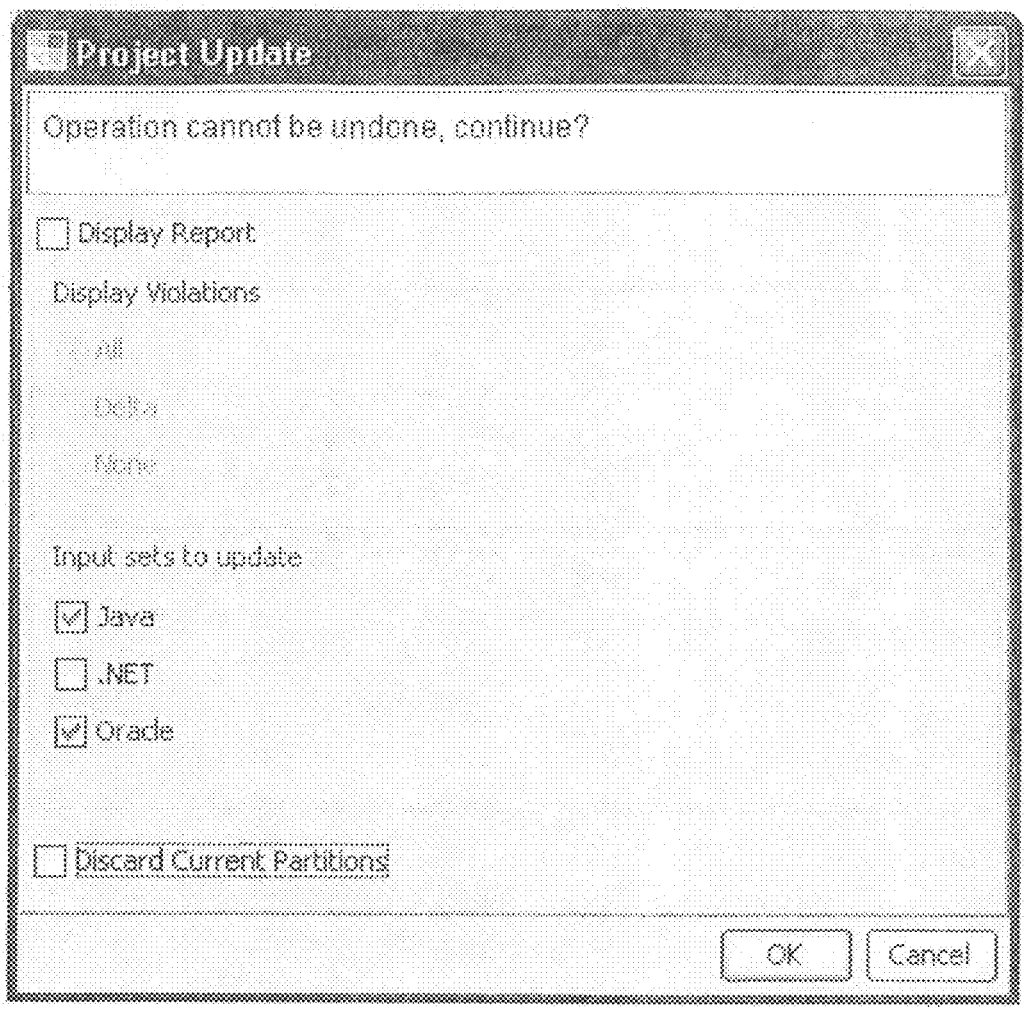
Figure 19: Update Dialog Multi-Domain LDM

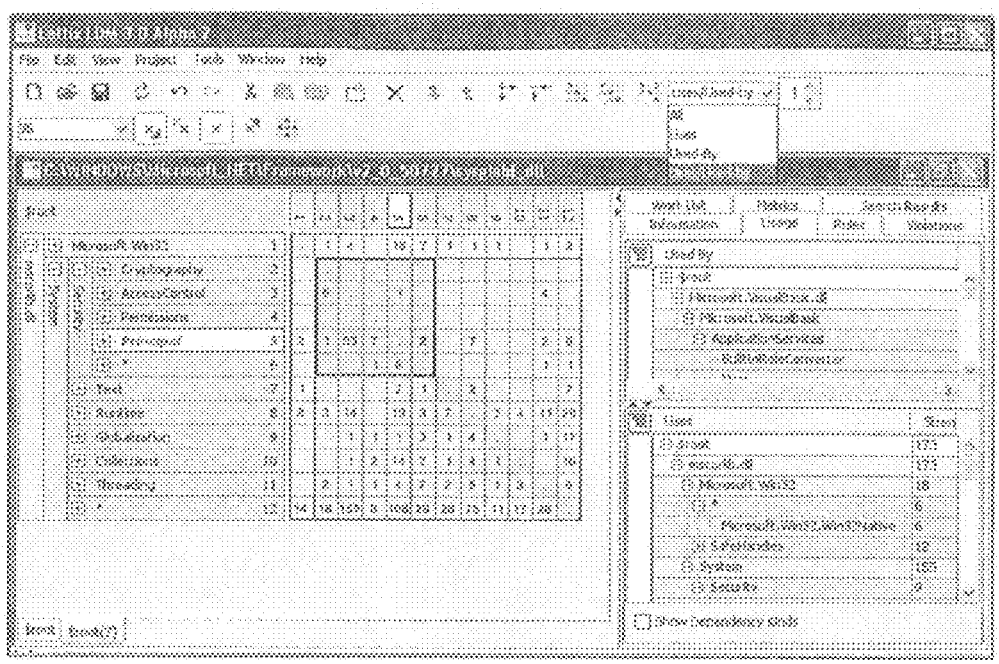
Figure 20: Impact Analysis

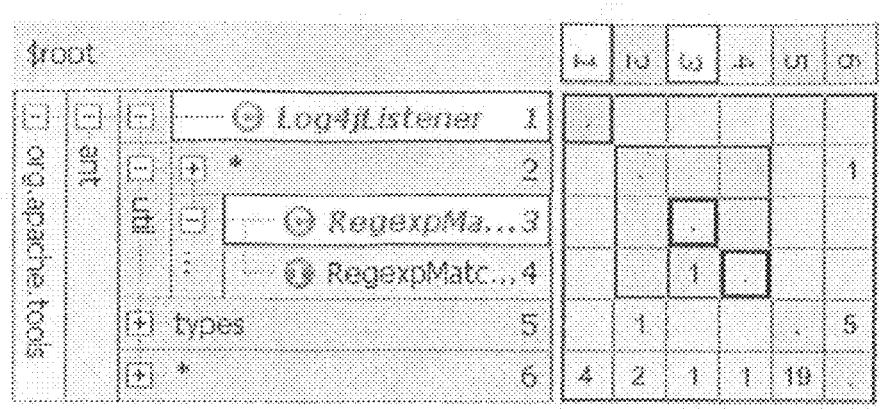
Figure 21: "Uses" DSM

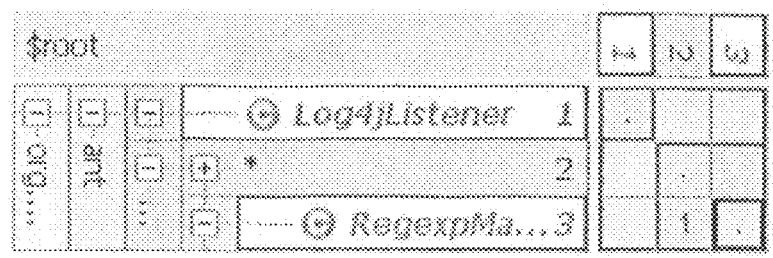
Figure 22: "UsedBy" DSM

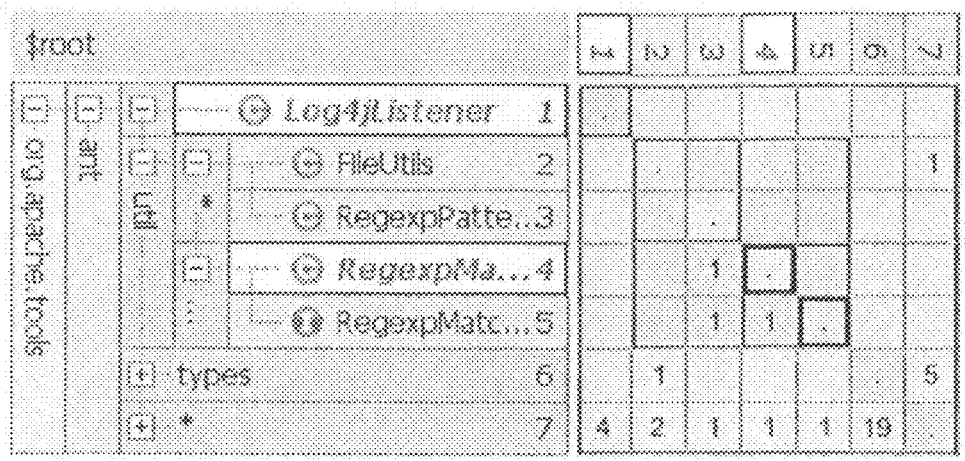
Figure 23: "Uses" & "UsedBy" DSM

APPARATUS AND METHODS FOR DISPLAYING AND DETERMINING DEPENDENCY RELATIONSHIPS AMONG SUBSYSTEMS IN A COMPUTER SOFTWARE SYSTEM

CROSS REFERENCE TO RELATED APPLICATIONS

The present application claims priority from provisional application Ser. No. 61/018,849, filed Jan. 3, 2008, and from provisional application 60/886,791, filed Jan. 26, 2007. The present application is also a continuation in part of U.S. patent application Ser. No. 10/941,618, filed Sep. 15, 2004, which claims priority from provisional application 60/504,401, filed Sep. 19, 2003, and provisional application 60/605,923, filed Aug. 31, 2004. Each of these related applications is hereby incorporated herein by reference in its entirety.

TECHNICAL FIELD

The present invention relates to dependency structures, including systems and methods for determining and displaying dependency structures between subsystems of a software program that includes a database.

BACKGROUND ART

In the field of software engineering, complex, large-scale software development projects can be difficult to manage. Ideally, the design of a software system is kept as modular or layered as possible in order to reduce interdependencies among subsystems. These interdependencies, especially cyclical ones, can be difficult to manage. A modular software system is easier to manage because the different modules, or subsystems, can be modified, removed and replaced without affecting too many other parts of the software system. While the architect of a software system might design the system to be modular initially, changes going into the system through time pressures and employee turnover in the software development team tend to decrease the modularity of the system. Subsystems become more interdependent over time as other priorities take precedence over maintaining the modularity of the system, resulting in greater likelihood of problems being introduced into the system. Further, as fewer software developers have knowledge of the overall system, the system becomes even more difficult to maintain. As the dependency structure of the software system becomes more complex, the system becomes more difficult to maintain. A desirable goal is to be able to manage this dependency structure adequately.

Relationships between different parts of a software system have been displayed diagrammatically in several ways in the prior art. As an example, FIG. 1 illustrates an example provided by HEADWAY REVIEW™ (from Headway Software, Waterford, Ireland). A directed arrow, such as directed arrow 102, shows that the subsystem at the source of the arrow, such as source subsystem 104, depends on the subsystem at the target of the arrow, such as target subsystem 106. Furthermore, HEADWAY REVIEW™ also allows a user to display what the dependency is. For a software system written in an object oriented language such as Java, some dependencies may be method calls or references to the fields of an object or inheritance relationships. The complexity of displaying inter-relationships, for even the limited nine subsystem system of FIG. 1, is evident.

FIGS. 2A and 2B from Yassine 2004 (Ali Yassine, "An Introduction to Modeling and Analyzing Complex Product Development Processes Using the Design Structure Matrix (DSM) Method", Quaderni di Management (Italian Management Review), www.quaderni-di-management.it, Nov. 9, 2004) is a prior art description of a system containing two subsystems. Dependency relationships between the subsystems are one of three possible types. In FIG. 2A, the Graph Representation 200 chart of these three types of relationships shows the two systems in a Parallel 202 relationship where neither subsystem A nor subsystem B depend on the other, a Sequential 204 relationship where subsystem B depends on subsystem A, but subsystem A does not depend on subsystem B, and a Coupled 206 relationship where subsystems A and B each depend on the other.

The types of directed graphs shown in FIG. 2A, also known as digraphs, may also be rendered in the form of a matrix, known as a Design Structure Matrix, or DSM as shown in FIG. 2B.

One way to address the dependency structure of a software system is to model the software system through the use of dependency matrices such as the design structure matrix or the dependency structure matrix (DSM). The approach is to decompose the system into subsystems and then to use the DSM to indicate the coupling between the subsystems to show the dependencies. A DSM is a square, symmetric matrix where a subsystem of a given system is placed as a header of a row of the matrix, and as a header of a column of the matrix. The row and column order of the subsystems is the same so that each subsystem is shown with a row named on the left and is shown with a column named at the top. Typically, the DSM is a binary matrix, where matrix cells contain either a 1 or a 0, or equivalently, an 'X' or the absence of any character. An indicator located at a grid location having commonality with a row and a column indicates a dependency of the subsystem associated with the row on the subsystem associated with the column. The indicators such as 'X' or '1' of these dependencies are also known as dependency marks. The dependency marks can represent various criteria such as the strength of the dependency between the two subsystems in the row and column associated with a particular grid location. In DSMs that incorporate hierarchy the dependency indication can also be an aggregation of dependencies between the all the elements of the hierarchy represented by the row and column subsystems.

The DSM Representation 250 of the digraph Parallel 202 relationship corresponds to the DSM Parallel 252 relationship, the digraph Sequential 204 relationship to the DSM Sequential 254 relationship, and the digraph Coupled 206 relationship to the DSM Coupled 256 relationship.

In the Sequential 254 DSM representation, the subsystem A does not depend on subsystem B. Consequently, the cell in the row with A in the header, and the column with B in the header is empty, having no dependency mark. The contents of the cells in a row associated with a subsystem indicate what other subsystems the subsystem in the row header depends upon. Similarly, the contents of cells in a column associated with a subsystem indicate for the subsystem in the column header what other subsystems depend upon the subsystem in the column header. For the row with the header B in the Sequential 254 DSM representation, the 'X' in the cell corresponding to the row B and the column A indicates that B depends on A. Cells where A intersects itself and B intersects itself are rendered in black. As dependency of a given subsystems upon itself is generally of lesser interest in the types of analysis enabled by DSM, these are frequently drawn as black, or with a period or a dot.

Figure 3A:
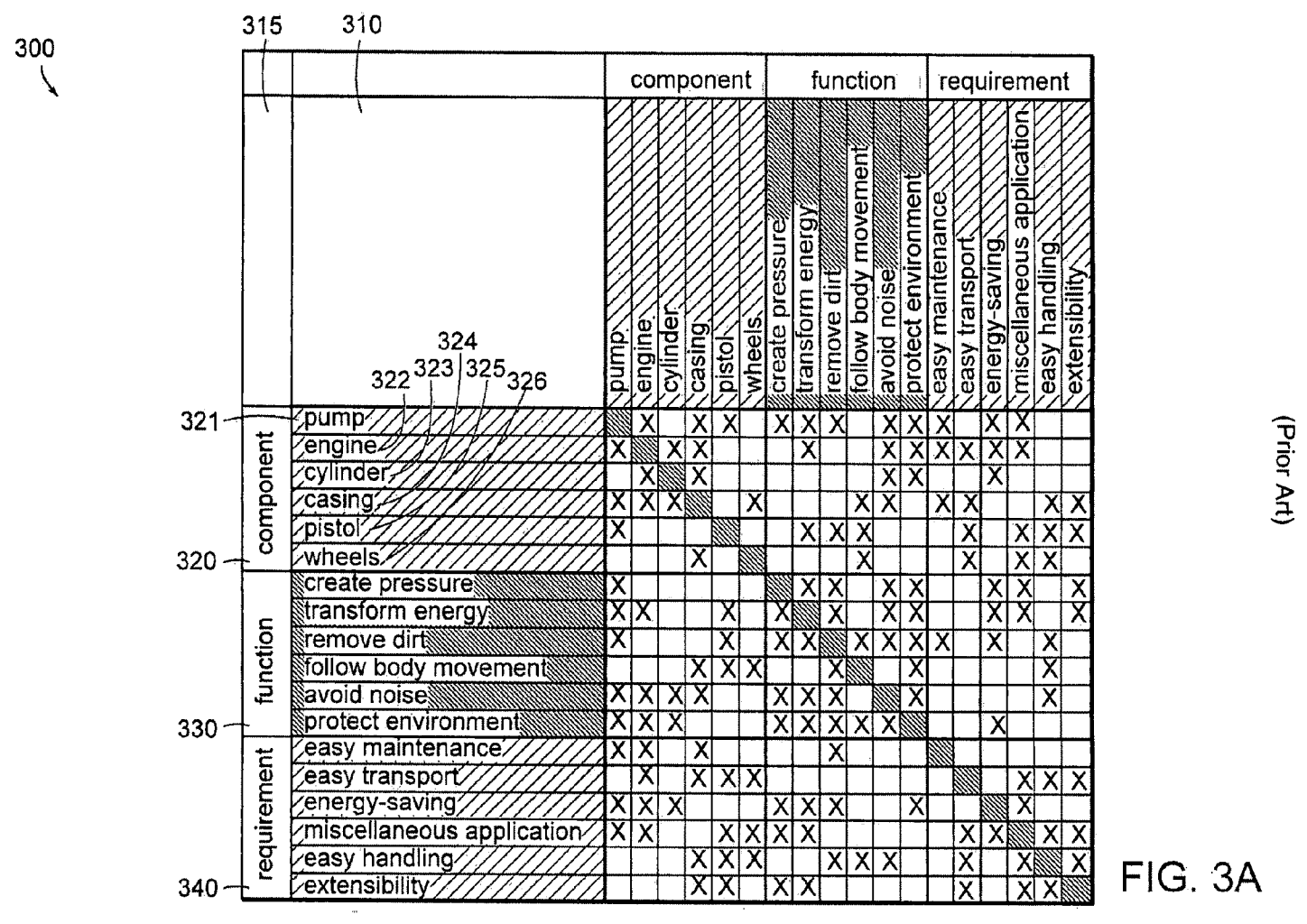

FIG. 3A, taken from Maurer et. al. (Maik Maurer, Udo Pulm, Udo Lindemann, "Tendencies toward more and more flexibility", 2003) includes a prior art engineering DSM 310 showing a dependency model of an automotive mechanical system with a limited use of hierarchy. Elements of the engineering DSM 300 correspond to a mixture of Subsystems (Components), Functions, and Requirements. The Maurer engineering DSM 310 shows the interrelatedness between these different aspects of an automotive design.

The Maurer engineering DSM 310 represents hierarchy with names of parents 315 (component 320, function 330, and requirement 340) to the DSM elements rotated 90 degrees. DSM element parents 315 are not represented in the DSM 310 distinctly, only through children. For example component 320 is represented through children pump 321, engine 322, cylinder 323, casing 324, piston 325, and wheels 326. However, the parent elements 315 are essentially separate aspects of the design, and not hierarchal within any of the three aspects. Further, the Maurer engineering DSM is limited to two levels. FIG. 3B from Maurer et al. illustrates an engineering DSM 350 showing a dependency model of a mechanical system with limited use of hierarchy in the DSM. FIG. 3 contains a two level component hierarchy where both parents, for example, pump 360, and children, for example, centrifugal pump 362 and plunger pump 364, in the hierarchy each have their own row and column for displaying dependencies. Representation shows hierarchy Parents grayed but in same list with children.

Engineering DSM 370 shows a hierarchy where parent grid cells have a gray background color, but indicate dependencies by inclusion of Xs that are redundant with the X-indicated dependencies for the children. Engineering DSM 370 is similarly a two-level display. FIG. 4 is a prior art diagram from Sabbaghian et al. 1998 (Sabbaghian, Nader, Eppinger, Steven D., and Murman, Earll, "Product Development Process Capture & Display Using Web-Based Technologies", Proceedings of the IEEE International Conference on Systems, Man, and Cybernetics, San Diego, Calif., Oct. 11-14, 1998, pp. 2664-2669) showing conceptually how DSM's may be thought of as a hierarchy through a series of completely separate DSM's representing different levels of hierarchy. However, any hierarchy in FIG. 4 is shown in separate DSM's. There is no rendering mechanism implied other than separate DSM's.

FIG. 5 is an illustration of a prior art DSM 500 from Dong 1999 (Qi Dong-"Representing Information Flow and Knowledge Management in Product Design Using the Design Structure Matrix," MIT ME Dept SM Thesis, January, 1999) showing how a second level of hierarchy may be provided by coloring the row and column headers with different colors. In this illustration, DSM 500 contains four top level subsystems (spatial function 510, sheet metal 520, electrical 530, and moveable glass 540) each having children, for example sheet metal function subsystem 520 with children including outer panel shape subsystem 522, pillars 524, halo 526, etc. The four top level subsystems are differentiated by color. However, this is also a two-level display.

Traditionally, databases are represented visually using Entity-Relationship (ER) Diagrams. These diagrams use boxes and arrows to represent database entities and the relationships between them. For instance, database tables are represented as boxes and a foreign key relationship is represented by a connecting arrow between the boxes. FIG. 6 shows a typical ER Diagram, such as in Computer Associates' ERWin product. Each Customer has a unique customer number and makes multiple payment transactions where each transaction is made by a specific customer identified by a customer number. Here the database tables are represented by rectangles and the relationship between them is represented by connecting lines. As the number of tables and their relationships increase these diagrams become hard to understand and to manage. Furthermore, these diagrams normally do not display many important elements of the database such as packages, sequences and stored procedures. They also do not display the relationships between many of these elements of the database. For instance, a stored procedure calling another stored procedure or a stored procedure referencing a table is not represented in ER diagrams.

Constructing a DSM where all the elements of the database are laid out in a flat structure would make the matrix large and hard to use. It is also important to construct a hierarchy that groups together related elements. There is no prior art guidance on how the hierarchy should be created for DSMs for databases. Another difficulty in representing a database system and discovering optimal groupings of subsystems is related to the difficulty of processing "Synonyms". Synonyms are database elements that are aliases for other elements of the database. Appropriate placement of Synonyms in the database hierarchy is crucial to understanding the relationship between various elements of the database.

New frameworks have been created to simplify programming with object oriented languages such as Java and .NET. The Spring Framework is one such example. Spring Framework defines entities called 'Spring Beans' which are managed by the Spring Framework. Users of Spring Framework specify Spring Beans in configuration files with each configuration being used to specify one or more beans. Typically, Spring Beans are visualized in network diagrams that depict beans as rectangles and relationship between them as connecting lines, as shown in FIG. 7. As the number of beans becomes large it becomes hard to make sense of these diagrams. Often, users of Spring Framework will specify related or similar Spring beans in the same configuration file. However, these diagrams do not take into account the file where the bean was specified. These diagrams also do not show the implementation class that is associated with the Spring Bean.

Most large enterprises employ a variety of systems that are often coupled to each other. For instance, there are many mission critical applications that might access data from a variety of databases. Normally, these are modeled separately. For instance, the application architecture might be modeled with UML while the data architecture might be modeled with ER diagrams. Another example of how systems are coupled together is applications created with frameworks such as Spring and Hibernate. Applications written in Java use the Spring Framework to manage and improve coupling between objects. However, Spring itself uses entities called "Spring Beans" which are related to Java classes and to other Spring Beans. As are result, it is desirable to view the architecture in terms of elements from the Spring Framework and from Java.

A difficulty in using DSMs for representing databases and multi-domain systems is the large number of total elements and the fact many of the elements might be organized in a flat structure. For example, a database schema might contain hundreds of tables; or a database itself might be composed of hundreds of schemata. Often, there are only a few relationships between them. The large number of elements also makes it hard to visualize how changing one element will affect which other elements.

SUMMARY OF THE INVENTION

In one embodiment, the present invention provides a method for managing, in a computer system, design of a database system having a set of schemata. The method includes, in a first computer process, extracting dependencies from the database system and identifying the set of schemata. The method further includes, for each specific schema in the set of schemata, creating in a second computer process a partition that, in turn, contains a further partition for each element of the specific schema, so as to establish a hierarchy of partitions in accordance with the structure of the set of schemata. The method also includes storing a representation of the database system including subsystems, dependency relationships among the subsystems, and the hierarchy of partitions. Finally, the method includes providing a graphical output from the computer system, based on the stored representation, in which appears a display of the subsystems in a hierarchy of partitions within a dependency structure matrix, such matrix graphically indicating the dependency relationships among subsystems.

In a further related embodiment, creating the partition in the second computer process includes creating the partition for a database table. The partition for the database table contains partitions for columns of the database table and partitions for all indexes of the database table. Alternatively or in addition, the hierarchy of partitions within the dependency structure matrix is selectively expandable and collapsible. Optionally, in an instance when a given parent subsystem has been expanded to show its hierarchical children, dependencies are shown for such hierarchical children but not for such parent subsystem.

In another further embodiment, relation of such hierarchical children to such parent subsystem is shown by placing the parent subsystem sidewise alongside such children.

In yet another further embodiment, the method additionally includes, in response to a graphical user input that alters the hierarchy of partitions displayed in the dependency structure matrix, automatically altering the dependency relationships among the subsystems to be consistent therewith, and updating the stored representation of the subsystems and dependency relationships among the subsystems. Optionally, the graphical user input altering the hierarchy of partitions includes moving a subsystem from one location to another, and automatically altering the dependency relationships includes operating in a manner as to preserve dependencies of subsystems affected by the alteration. Alternatively or in addition, the graphical user input altering the hierarchy of subsystems includes removing a subsystem and automatically altering the dependency relationships includes operating in a manner as to cause removal of dependencies of the removed subsystem. Also alternatively or in addition, the graphical user input altering the hierarchy of subsystems includes adding a subsystem, and automatically altering the dependency relationships includes operating in a manner as to preserve the dependencies of the added subsystem.

In yet another further embodiment, storing a representation of the database system includes causing elements, of the database system, that are public synonyms for other elements of the database system to be excluded from the stored representation.

In another further embodiment, storing a representation of the database system includes causing an element, of the database system, that is a public synonym for other elements of the database system to be placed within a partition that represents a schema containing an element upon which that synonym depends.

In another further embodiment, storing a representation of the database system includes causing an element, of the database system, that is a public synonym for other elements of the database system to be placed within a subsystem containing all public synonyms.

In another embodiment, the invention provides a method for managing, in a computer system, design of a Spring Framework software system containing a set of configuration files. The method of this embodiment includes:

in a first computer process, parsing the set of Spring Framework configuration files to produce a stored representation of the Spring Framework software system including subsystems and dependency relationships among the subsystems;

in a second computer process, for each specific Spring Framework configuration file of the set, creating a partition that, in turn, contains a further partition for each Spring Bean that is specified in such Spring Framework configuration file, so as to establish a hierarchy of partitions in accordance with the structure of the set of Spring Framework configuration files; and providing a graphical output from the computer system, based on the stored representation, in which appears a display of the hierarchy of partitions within a dependency structure matrix, such matrix graphically indicating the dependency relationships among subsystems.

In another embodiment, the invention provides a method for managing, in a computer system, design of a software system containing a plurality of domains. The method of this embodiment includes, in a first computer process, extracting atoms and dependencies from the software system for a first one of the domains and a second one of the domains. The method further includes, in a second computer process, generating a hierarchy of partitions for each of the first and second domains based on their atoms and dependencies. The method additionally includes, in a third computer process, with respect to atoms associated with both the first and the second domains, merging partitions of the first and second domains into a merged partition containing such atoms. The method also includes storing a representation of the software system based on results of the first, second, and third computer processes. Finally, the method includes providing a graphical output from the computer system, based on the stored representation, in which appears a display of the merged partition in a hierarchy within a dependency structure matrix, such matrix graphically indicating the dependency relationships in the merged partition.

In a further related embodiment, the first domain is a Spring Framework domain and the second domain is a Java domain.

In another embodiment, the invention provides a method for displaying dependency relationships among subsystems of a software system. The method of this embodiment includes:

in a first computer process, parsing the software system (i) to produce a stored representation of the software system including subsystems and dependency relationships among the subsystems and (ii) to provide a graphical output, from the computer system, based on the stored representation of the software system, in which appears a display of the subsystems in a hierarchy within a dependency structure matrix, such dependency structure matrix graphically indicating the dependency relationships among subsystems;

providing a user input, through a graphical interface, for marking, in the dependency structure matrix, at least one subsystem according to a proposed scheme;

in a third computer process, identifying related subsystems that are in a direct or indirect dependency relationship with the at least one marked subsystem to produce a modified stored representation including the related subsystems, the at least one marked subsystem, and dependency relationships among them; and providing a graphical output, from the computer system, based on the modified stored representation, in which appears a display of the related subsystems and the at least one marked subsystem in a hierarchy within a modified dependency structure matrix, such modified matrix graphically indicating dependency relationships only among the related subsystems and the at least one marked subsystem.

In a further related embodiment, providing a user input, through a graphical interface for marking at least one subsystem according to a proposed scheme includes marking at least one subsystem associated with a specific property or metadata. Alternatively or in addition, identifying related subsystems includes identifying related subsystems that either use or are used by the at least one marked subsystem.

In another embodiment, the invention provides an apparatus, implemented in a computer system, for managing design of a database system. The database system has a set of schemata. The apparatus of this embodiment includes an input for receiving the database system to be managed. The apparatus of this embodiment additionally includes a dependency extractor, coupled to the input, and a partitioner, coupled to the dependency extractor, the dependency extractor and the partitioner collectively querying the database system to produce a representation of the database system including atoms therein and dependency relationships among the atoms, according to a structure of the database system. This embodiment also includes a system representation storage arrangement, coupled to the dependency extractor and the partitioner, that stores the representation of the database system. Additionally, the embodiment includes:

a graphical interface that receives a user input of a new rule governing a dependency relationship among at least two specific atoms;

a design rules storage arrangement that stores design rules associated with the database system;

a rule engine, coupled to the system representation storage arrangement and to the design rules storage arrangement, that creates, modifies, and evaluates the design rules; and a display output, such output coupled to the system representation storage arrangement and to the rule engine, that provides a graphical display of the stored representation of the database system and visual indication, in the graphical display, of atoms with respect to which the new rule has been applied;

wherein at least one of the graphical interface and the graphical display is in the form of a dependency structure matrix.

In another embodiment, the invention provides an apparatus, implemented in a computer system, for managing design of a software system. The software system includes subsystems from a plurality of domains. The apparatus of this embodiment includes:

an input that receives the software system to be managed;

a first dependency extractor, coupled to the input, that extracts atoms and dependencies among the atoms, of a first subsystem in a first domain;

a second dependency extractor, coupled to the input, that extracts atoms and dependencies among the atoms, of a second subsystem in a second domain;

a partitioner, coupled to the first and the second dependency extractors, that creates partitions for each of the first and the second domains based on the respectively extracted atoms and dependencies, a merge manager that merges the partitions for each of the first and second domains into merged partitions having atoms associated with both the first and the second domains, wherein the dependency extractors, the partitioner, and the merge manager collectively produce a representation of the software system including the subsystems and dependency relationships among the subsystems and including the atoms and dependency relationships among the atoms;

a system representation storage arrangement, coupled to the dependency extractor, the partitioner, and the merge manager, the system representation storage arrangement storing the representation of the software system; and a display output coupled to the system representation storage arrangement, such output configured to provide a graphical display, based on the representation of the software system stored in the system representation storage arrangement, of the subsystems in a hierarchy within a dependency structure matrix, the dependency structure matrix graphically indicating the dependency relationships among subsystems.

In other embodiments, the invention provides various computer program products. In one embodiment, the invention provides a computer program product for use on a computer system for managing design of a database system. The database system has a set of schemata. The computer program product includes a computer usable medium having computer readable program code thereon, which, when loaded into the computer system, establishes an apparatus, implemented in the computer system, and the apparatus includes:

an input for receiving a database system to be managed;

a dependency extractor, coupled to the input, and a partitioner, coupled to the dependency extractor, collectively querying the database system to produce a representation of the database system including the database elements and dependency relationship among the database elements, according to a structure of the database system;

a system representation storage arrangement, coupled to the partitioner and the dependency extractor, that stores the database system representation;

a graphical interface configured to receive a user input of a new rule governing a dependency relationship among at least two of the database elements;

a design rules storage arrangement that stores design rules associated with the database system;

a rule engine, coupled to the system representation storage arrangement and to the design rules storage arrangement, that creates, modifies, and evaluates the design rules; and a display output, such output coupled to the system representation storage arrangement and to the rule engine, that is configured to provide a graphical display of the stored representation of the database system and visual indication, in the graphical display, of the database elements with respect to which the new rule has been applied;

wherein at least one of the graphical interface and the graphical display is in the form of a dependency structure matrix.

In a related embodiment, the display output is further configured to provide a display of the database elements in a hierarchy within the dependency structure matrix, the hierarchy being selectively expandable and collapsible and the dependency structure matrix graphically indicating dependency relationships among the database elements. Alternatively the graphical interface is further configured to receive the user input specifying elements, of the database, that are synonyms for other database elements to be excluded from the stored database system representation. Alternatively, the graphical user interface is further configured to receive the user input causing an element, of the database, that is a synonym for other database elements, to be placed within a partition that represents a schema containing an element upon which that synonym depends. Alternatively, the graphical interface is further configured to receive the user input causing an element, of the database, which is a public synonym for other database elements to be placed in a subsystem containing all public synonyms.

In another embodiment, the invention provides a computer program product for use on a computer system for managing, in a computer system, design of a Spring Framework software system containing a set of configuration files. The computer program product of this embodiment includes a computer usable medium having computer readable program code thereon, which, when loaded into the computer system, establishes an apparatus, implemented in the computer system. The apparatus includes:

an input for receiving the Spring Framework software system to be managed;

a dependency extractor and a partitioner, collectively parsing the set of Spring Framework configuration files and creating partitions for each Spring Framework configuration file of the set and each Spring Bean specified in that Spring Framework configuration file to produce a representation of the Spring Framework software system including subsystems and dependency relationships among the subsystems;

a system representation storage arrangement, coupled to the partitioner and the dependency extractor, that stores the representation of the software system; and a display output, coupled to the system representation storage arrangement, that provides a graphical display, based on the representation stored in the system representation storage arrangement, of the subsystems in a hierarchy of partitions within a dependency structure matrix, such matrix graphically indicating the dependency relationships among subsystems.

In yet another embodiment, the invention provides a computer program product for use on a computer system for managing design of a software system which is comprised of subsystems from a plurality of domains. The computer program product of this embodiment includes a computer usable medium having computer readable program code thereon, which, when loaded into the computer system, establishes an apparatus, implemented in the computer system. the apparatus includes:

an input that receives the database system to be managed;

a first dependency extractor, coupled to the input, that extracts atoms and dependencies among the atoms, of a first subsystem in a first domain;

a second dependency extractor, coupled to the input, that extracts atoms and dependencies among the atoms, of a second subsystem in a second domain;

a partitioner, coupled to the first and the second dependency extractors, that creates partitions for each of the first and the second domains based on the respectively extracted atoms and dependencies, a merge manager that merges the partitions for each of the first and second domains into merged partitions having atoms associated with both the first and the second domains, wherein the dependency extractors, the partitioner, and the merge manager collectively produce a representation of the database system including the subsystems and dependency relationships among the subsystems as well as the atoms and dependency relationships among the atom;

a system representation storage arrangement, coupled to the dependency extractors, the partitioner, and the merge manager, the system representation storage arrangement storing the representation of the software system; and a display output coupled to the system representation storage arrangement, such output configured to provide a graphical display, based on the representation of the software system stored in the system representation storage arrangement, of the subsystems in a hierarchy within a dependency structure matrix, such matrix graphically indicating the dependency relationships among subsystems.

In a further related embodiment, the apparatus includes a mapping dependency extractor that extracts from a mapping subsystem mapping dependencies between the first and the second domains. Additionally, the merge manager merges, based on the mapping dependencies, at least a portion of the dependencies from the first and second domains into a merged partition having atoms associated with both the first and the second domains.

In yet another embodiment, the invention provides a computer program product for use on a computer system for displaying relationships among subsystems of a software system. The computer program product includes a computer usable medium having computer readable program code thereon, which, when loaded into the computer system, establishes an apparatus, implemented in the computer system. The apparatus includes:

an input for receiving a software system to be analyzed;

a dependency extractor, coupled to the input, and a partitioner, coupled to the dependency extractor, the dependency extractor and a partitioner collectively parsing the software system to produce a representation of the software system including subsystems and dependency relationships among the subsystems, according to a structure of the software system;

a system representation storage arrangement, coupled to the dependency extractor and the partitioner, that stores the representation of the software system;

a display output, coupled to the system representation storage arrangement, that is configured to provide a graphical display of the stored representation of the database system in a hierarchy within a dependency structure matrix;

a graphical interface, configured to receive a user input for marking, in the dependency structure matrix, of at least one subsystem according to a proposed scheme;

wherein the dependency extractor and partitioner are further configured to produce a modified representation of the software system, including only the at least one marked subsystem and related subsystems that are in direct or indirect relationship with the at least one marked subsystem, and dependency relationships among the at least one marked subsystem and the related subsystems; and wherein a display output is further configured to provide a graphical output, from the computer system, based on the modified stored representation, in which appears a display of the related subsystems and the at least one marked subsystem in a hierarchy within a modified dependency structure matrix, such modified matrix graphically indicating the dependency relationships only among the related subsystems and the at least one marked subsystem.

In a further related embodiment, the graphical interface is configured to receive a user input is further configured to receive a user input for marking of at least one subsystem associated with a specific property or metadata. Alternatively or in addition, the dependency extractor and the partitioner are further configured to produce the modified representation of the software system treating as related subsystems any subsystems that either use or are used by the at least one marked subsystem.

BRIEF DESCRIPTION OF THE DRAWINGS

The foregoing features of the invention will be more readily understood by reference to the following detailed description, taken with reference to the accompanying drawings, in which:

FIGS. 3A and 3B show prior art DSM renderings with two fixed levels of hierarchy, in one case, with rotated first level headers from Maurer et al. (2003);

FIG. 6 is a prior art ER Diagram for a Database from ERWin;

FIG. 7 is a prior art diagram for visualizing Spring Beans;

FIG. 8 provides an architectural block diagram of LDM, which has been implemented in accordance with an embodiment of the present invention;

FIG. 9 is a flow chart architectural diagram of LDM;

FIG. 10 is a diagram illustrating a dialog where options are specified for connecting to a database in accordance with an embodiment of the invention;

FIG. 11 is a diagram illustrating options to select the schemata for which the dependency information is extracted in accordance with an embodiment of the invention;

FIG. 12 is a diagram illustrating options on how synonyms are treated when creating a DSM for a database in accordance with an embodiment of the invention;

FIG. 13 is a diagram illustrating a DSM for a database that is created in accordance with an embodiment of the invention;

FIG. 14 is a diagram illustrating a DSM for an application based on the Spring Framework that is created in accordance with an embodiment of the invention;

FIG. 15 is a diagram illustrating typical decomposition that is done for an Oracle database for representation in a DSM. The database is decomposed into database wide triggers, db links and schemata. Each of the schemata is decomposed into tables, views, triggers, sequences, stored procedures and packages. Each of the tables is decomposed into columns, indexes and constraints;

FIG. 16 is an architectural block diagram of a multi-domain LDM;

FIG. 17 is a flow chart architectural diagram of a multi-domain LDM;

FIG. 18 is an example of a multi-domain DSM that shows a system which includes an application and data.

FIG. 19 is an illustration of a dialog box that is used to update the DSM when the input systems change.

FIG. 20 is an illustration of marking a subsystem as changed in order to understand the impact of change.

FIG. 21 illustrates a "Uses" DSM which shows all elements that are used by a group subsystems marked for change.

FIG. 22 illustrates a "Used-By" DSM which shows all elements that use a group subsystems marked for change.

FIG. 23 illustrates a "Uses and Used-By" DSM which shows all elements that either use or are used by a group of subsystems marked for change.

DETAILED DESCRIPTION OF SPECIFIC EMBODIMENTS

Figure 1:
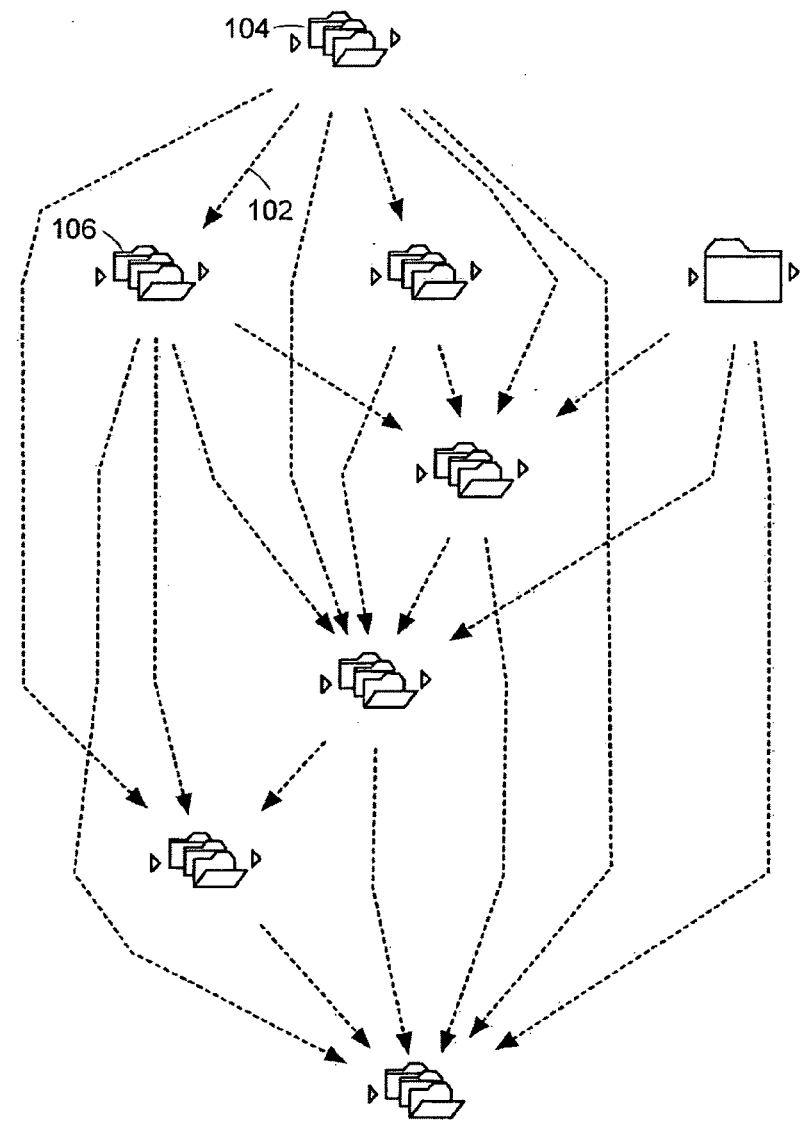
FIG. 1 is a prior art Directed Graph rendering of subsystem relationships from Headway Review.
Figure 2A:
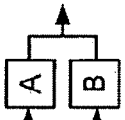
FIGS. 2A and 2B provide a comparison between a graph representation and a DSM representation of relationships between two subsystems in accordance with the prior art.
Figure 2B:
Figure 3B:
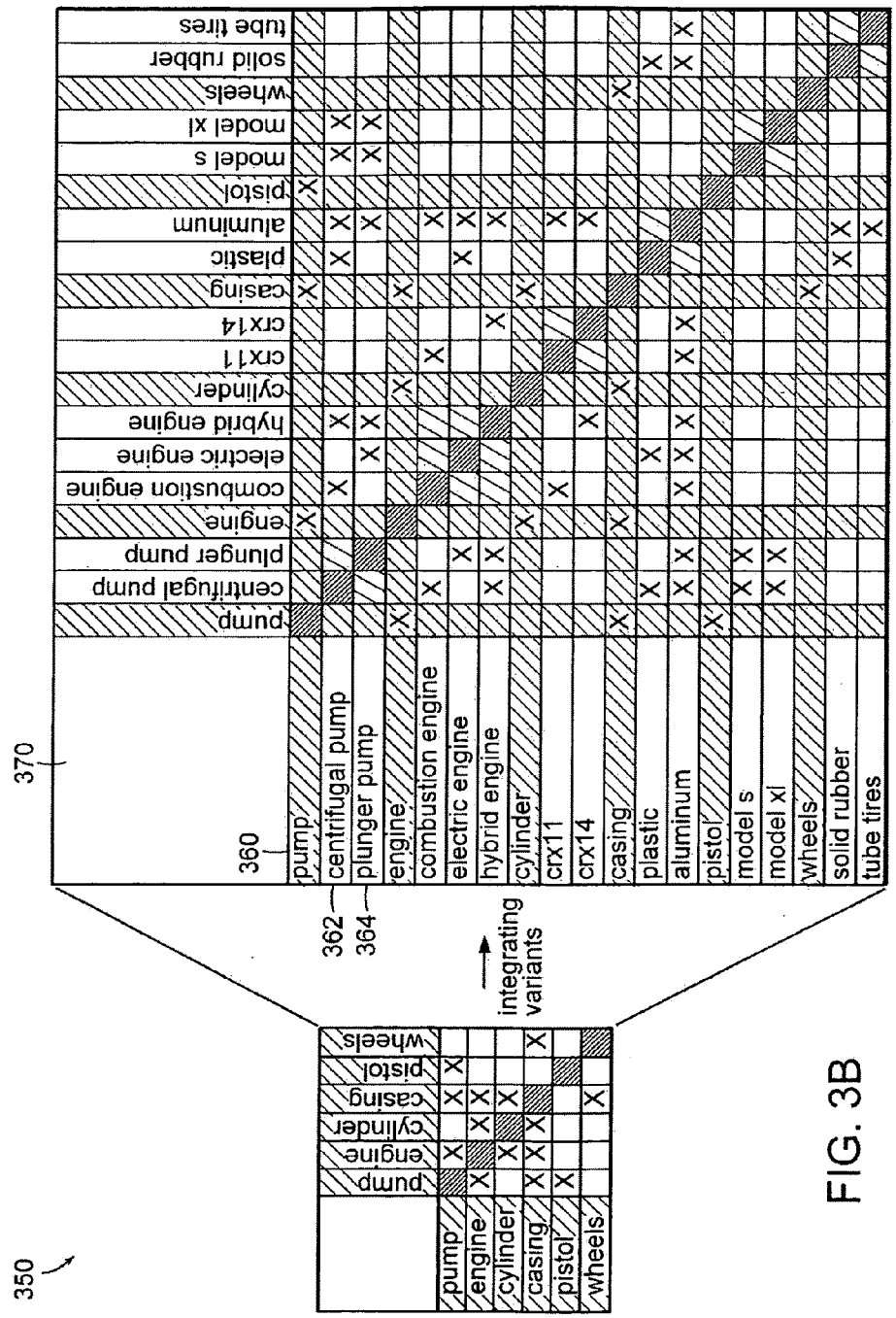
Figure 4:
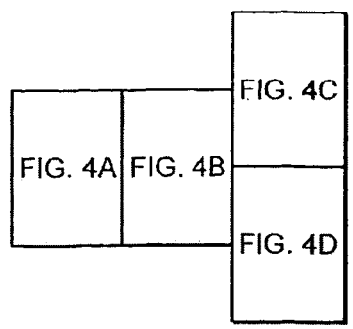
FIG. 4 is a prior art DSM series showing multiple level as a series of separate yet related DSMs from Sabbaghian et al. (1998)
Figure 4A:
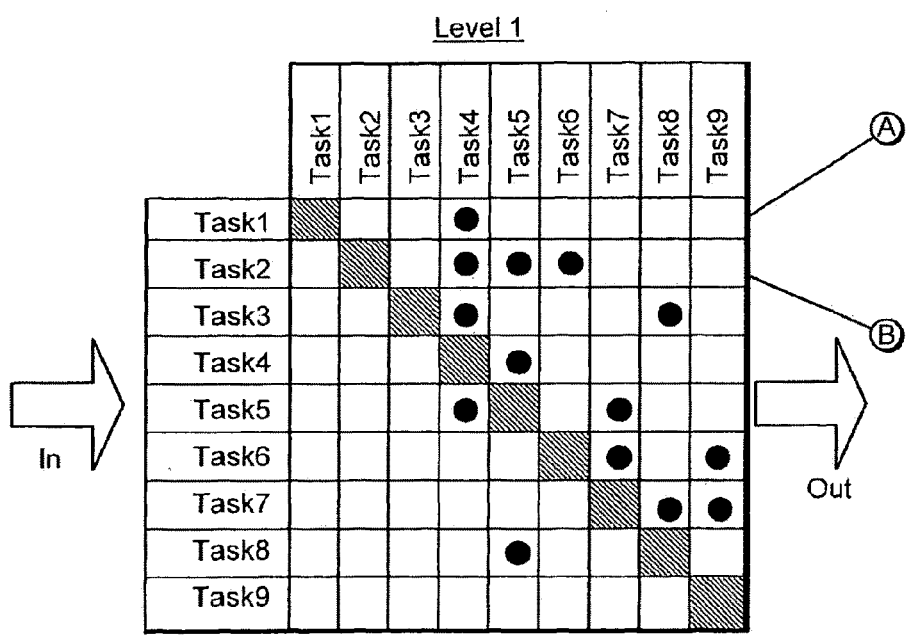
Figure 4B:
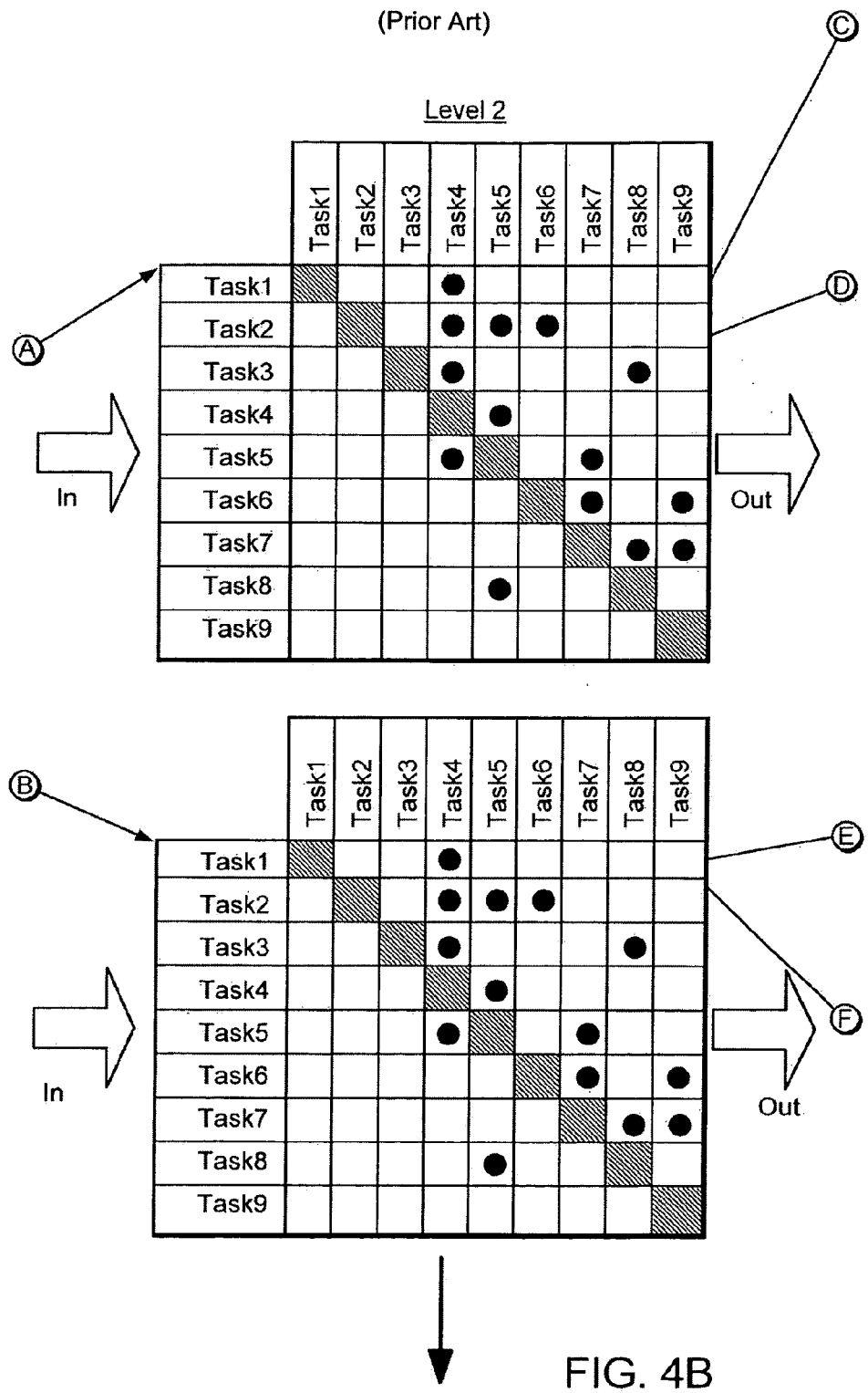
Figure 4C:
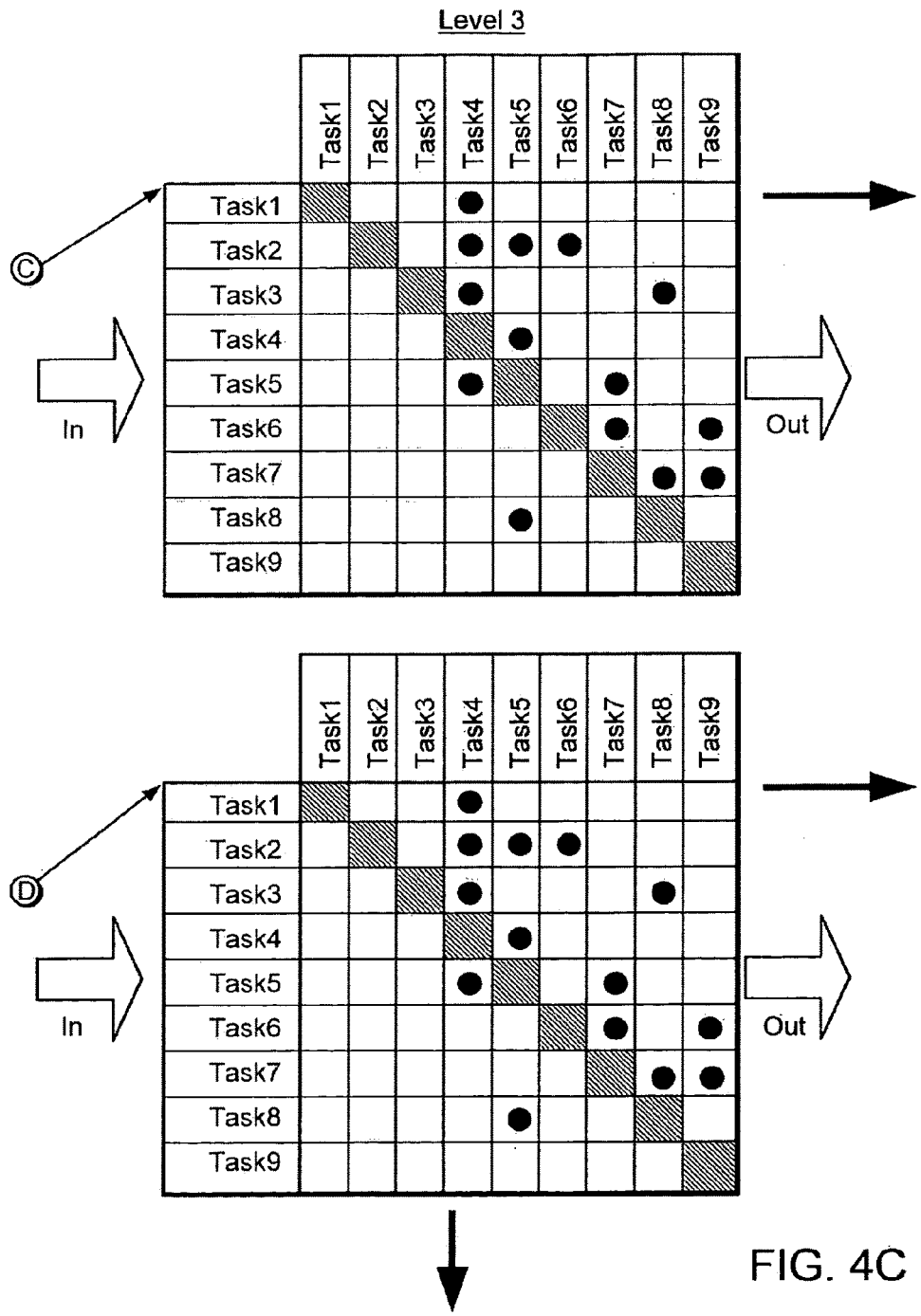
Figure 4D:
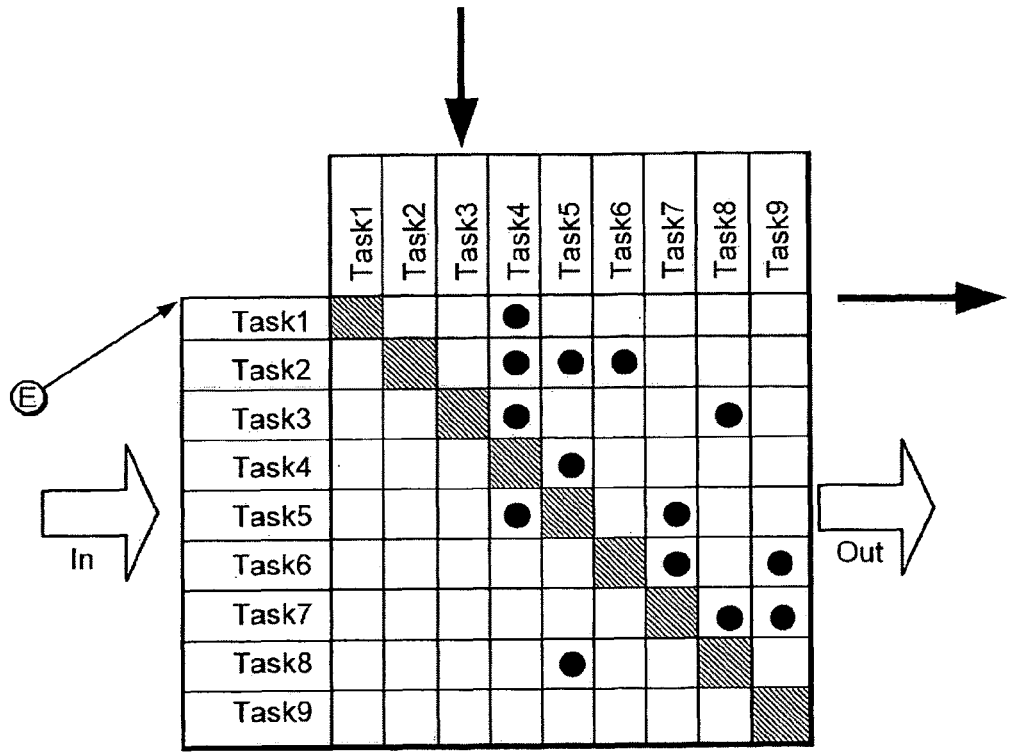
Figure 4D:
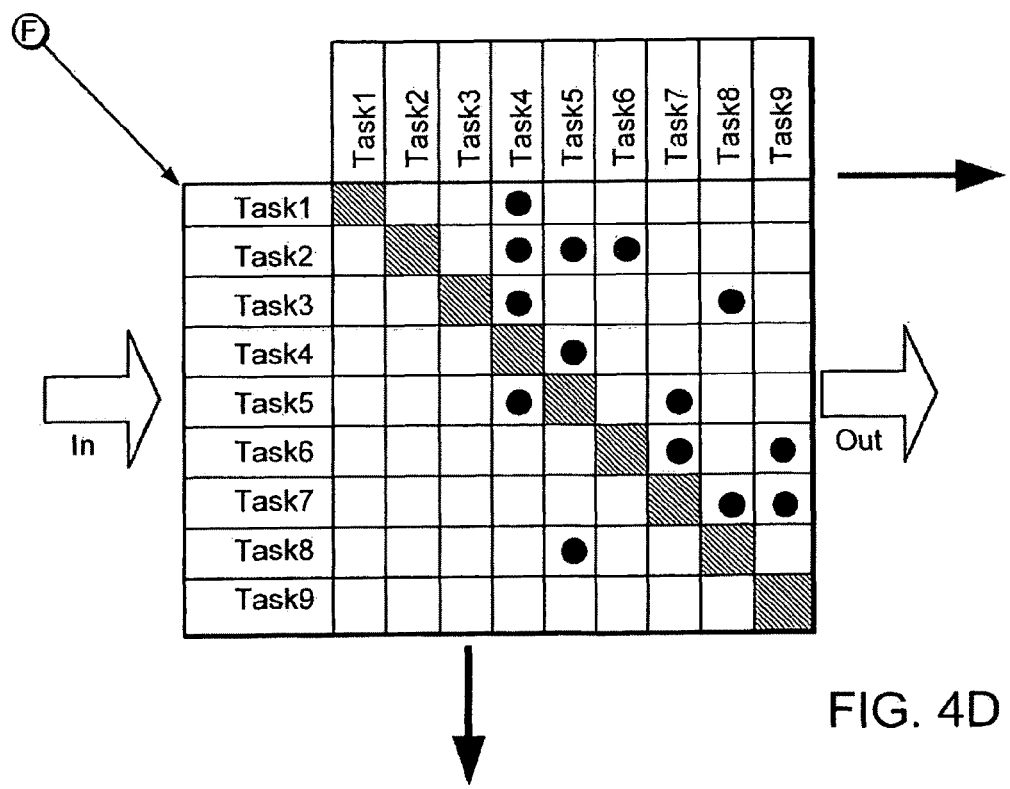
Figure 5:
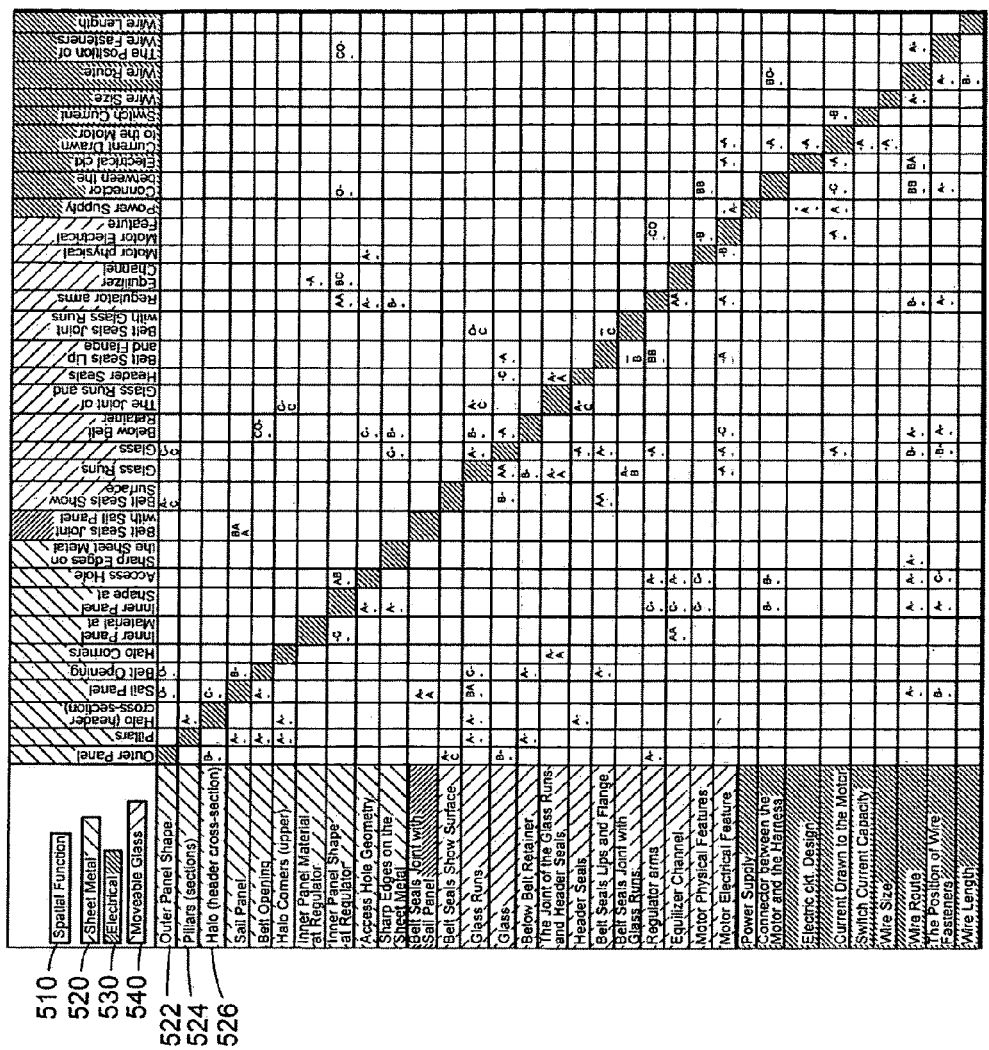
FIG. 5 is a prior art DSM rendering with one level of hierarchy and a second, fixed level implied by header color from Dong (1999)

Definitions. As used in this description and the accompanying claims, the following terms shall have the meanings indicated, unless the context otherwise requires:

A "dependency structure matrix" (DSM) is a symmetric matrix, frequently a binary matrix, with matching horizontal and vertical axes, so that a corresponding row and column relate to the same subsystem and each cell has a value indicative of the strength of the dependency. A DSM has also been referred to in the literature as a "dependency structure matrix", "dependency structure model", and "adjacency matrix."

A "subsystem" means any portion of a software system, regardless of the level of granularity, so that a subsystem includes class, package, module, component, layer, file, directory, partition, etc, depending on the level of granularity selected and includes data on which computer instructions may operate. One example of a subsystem is a database.

A "domain" is a technology-based category of a subsystem. In other words, a software system (as we have defined previously) may have one or more subsystems, and subsystems may be broadly categorized into "domains." For instance, a first domain of a subsystem may be a computer software module and a second domain of the subsystem may be a data system on which the computer software module operates. A third domain of the subsystem may be a mapping between the first and second domains. For instance, the part of a system that is implemented in the Java language is referred to as the "Java Domain". Other examples of domains are: "Oracle" for the part of the system that is implemented using an Oracle database, and "Spring" for the part of the system that is implemented using Spring Framework configuration files and annotations.

A "synonym" is a database element that is an alias for another element of the database.

A "rule" means a design rule that relates to design of a software system.

The "state" of a rule means any one or more of: the existence of the rule, or the fact of violation of the rule, or the fact of compliance with the rule, or the nature of the rule.

A "property", generally, is a characteristic trait or peculiarity, especially one serving to define or describe its possessor. A "property" of a subsystem is a characteristic trait of that subsystem that is discernable externally and may be used for comparison, calculation, or in establishing criteria.

A target subsystem is "affected" by a change made by editing or addition of code to a given subsystem if either (i) the target subsystem is the given subsystem or (ii) the target subsystem has a dependency relation with the given subsystem.

"DSM-Partitioning" a software system is sequencing items in the system having dependency relationships in a manner that tasks associated with them are ordered so that information needed for any task in the series exists on the basis of tasks already performed. DSM-Partitioning practiced in the prior art associated with DSM-Partitioning uses several algorithms that produce the same results, including the reachability matrix method, the powers of adjacency method, and path searching. A "partition" therefore is a member of a hierarchy of partitions that result from DSM-Partitioning. Because the hierarchy of partitions is a representation of a software system, the hierarchy of partitions is a construct, displayed in embodiments of the present invention in a DSM. This construct may initially show actual dependency relations among actual subsystems of an actual software system. However, embodiments of the present invention permit alteration of the hierarchy of partitions, including by user intervention (as described herein), and, when a suitable design of a potential software system represented by the hierarchy has been created, it is then up to the software designer to create an actual software system that corresponds to the potential software system thus represented. The potential software system thus represented, of course, includes subsystems having various dependency relationships, which are displayed in embodiments hereof in the DSM.

"DSM element" is one of the items represented by a row and a column in a DSM. A "DSM element" may be referred to as simply an "element" or "row" or "subsystem" or "partition" when in the context of discussing analysis of or manipulations to a DSM.

An "atom" is an element from the underlying domain that has dependencies on other atoms. For instance, a Java class is an example of an atom which can have dependencies on other Java classes. A Table and a Stored Procedure are examples of atoms in an Oracle Database where a Table or a Stored Procedure can have dependencies on other Tables or Stored Procedures. Partitions contain atoms and the dependency between partitions is derived from the dependency between the atoms within those partitions. Moreover, in a database having a set of schemata, each schema of the set of schemata has elements such as tables and stored procedures corresponding to atoms. The atoms are contained in partitions, so that dependencies for a given partition are determined as an aggregation of all dependencies of its atoms, A "cell" in the context of a DSM refers to an intersection between two DSM elements. For instance, the intersection seen at row 3, column 1 of a DSM is referred to as a cell at (3,1).

Illustrative Embodiments

Embodiments of the invention permit developers to more readily understand how different parts of a complex software system relate to one another. A designer may precisely define dependencies of one part of the software system on another part of the system in terms of a textual description, design rules, and set of actual dependencies. The design rules define the permissible ways in which subsystems may interact with each other, while the actual usage contains the actual dependencies. Designers may use the design rules to capture many of the design decisions, thereby permitting automatic verification and enforcement of the design rules. Consequently, the integrity of the product may be communicated and maintained over the life of the product.

FIG. 8 is a block diagram of an embodiment of the present invention for databases, termed "LDM", computer application 800. In LDM, the User Interface (UI) subsystem 813 provides features for user interaction via a graphical windowing system, including, in certain cases, windows, menus, dialogs, and similar features.

Project subsystem 811 provides business logic, data structures, and methods for the internal core of the LDM computer application 800, including Database Dependency Extractor 806 for generating the Atoms and Dependencies of Database System 801 being analyzed and provided with architecture management. The Project subsystem 811 also includes System Partitioner 808 for generating the Partitions and Rule Engine 810 for creating, modifying, and evaluating design rules.

Stored Project 805 is the stored portion of the Project 811, which is retained in non-volatile storage, such as hard disk, where atoms & Dependencies 802, Partitions 803 and Design Rules 804 are stored for ongoing use.

The Database Dependency Extractor 806 initially extracts the dependencies from the Database 801. These dependencies are extracted by directly connecting to the database and querying the relevant tables within the database where the information about the database elements and their dependencies is maintained. If necessary, the code associated with certain elements is also extracted from these tables and parsed to extract additional dependencies between various elements of the database. The Database Dependency Extractor 805 extracts the information and passes it to the System Partitioner 806 in the form of atoms and Dependencies 807.

The System Partitioner 808 then generates the Partitions 809 of the System. As used herein, software partitions are equivalent to software subsystems. The Partitions are constructed from the atoms and are organized in a hierarchy of Partitions. Given an atom, the System Partitioner can construct different partition hierarchies. For instance, atoms corresponding to Tables within an Oracle Schema leads to the creation of a Partition for the Schema; and within this Partition are Partitions, one for each of the tables within that Schema. For an example of the partitions that are generated from an atom, consider a table "CUSTOMER" in schema "SALES". The atom for the table is named "SALES.CUSTOMER". The System Partitioner generates the following Partitions: "SALES", "SALES.TABLE", and "SALES.TABLE.CUSTOMER". The Partition "SALES" contains the Partition "SALES.TABLE". The Partition "SALES.TABLE" contains the Partition "SALES.TABLE.CUTOMER". The Partition "SALES.TABLE.CUSTOMER" contains the atom "SALES.CUTOMER". The dependencies for a Partition are the aggregation of all the dependencies of the atoms within that Partition. When the user utilizes the user interface to change the hierarchy interactively the consistency of the DSM is maintained by recalculating the dependencies of the partitions based on the atoms that are contained within those partitions.

Following initial dependency extraction of the Database System 801, the user of LDM computer application 800 may use the Rule Engine 810 to define Design Rules 812 for the Database System 801. Design Rules 812 are rules regarding permissible or asserted Dependency relationships between Partitions 809. Rule Engine 810 evaluates Design Rules 812 and determines if any violations of the Design Rules 812 exist between the Partitions 809 and their relationships. The Rule Engine 810 also provides methods for creating, modifying, and deleting the Design Rules 812.

FIG. 9 provides a flow chart of information processing of the embodiment of the LDM computer application 800. The Atoms and Dependencies for Database System 801 are extracted using the Database Dependency Extractor 806. System Partitioner 808 partitions the atoms and dependencies and produces an in-memory representation of the Partitions 809. As mentioned previously, software partitions are equivalent to software subsystems and Software Partitions 809 contain information related to the subsystems of the Database System 801 being analyzed and managed.

The Extract Dependencies 905 process produces an in-memory representation of the atoms and the dependency information 907. The Generate Partitions 906 process takes the In Memory Atoms and Dependency Information 907 and produces the In Memory Partitions 908. From the In Memory Atoms and Dependencies 907 and In Memory Partitions 908, "Create Presentation for System Representation with Design Rules Applied" 910 may create User Presentation 912, which is the on-screen presentation of this information to the user. With creation of User Presentation 912, the user of the LDM computer application 800 may create In Memory Design Rules 909, applicable to the In Memory Partitions 908.

The user of LDM computer application 800 may use Create/Modify Additional System Representation and Design Rules 911 to augment In-Memory Partitions 908 by partition editing operations such as creating new partitions, splitting partitions, aggregating partitions, deleting partitions, and renaming partitions. When Design Rules 812 are created or modified by the process Create/Modify Additional System Representation and Design Rules 911, Design Rules 812 are initially stored in In-Memory Design Rules 909 data. In-Memory Atoms and Dependencies 907, Partitions 908 and In-Memory Design Rules 909 data may be written out to the stored versions of Atoms and Dependencies 802, Partitions 803 and Design Rules 804.

Once stored as Stored Project 805, Atoms & Dependencies 802, Partitions 803, and Design Rules 804, In-Memory Atoms & Dependencies 907, Partitions 908 and Design Rules 909 data may be read from the stored versions of Atoms & Dependencies 802, Partitions 803, and Design Rules 804, rather than as a result of re-executing processes Extract Dependencies 905 and Generate Partitions 906.

Creating a DSM for a Database System

A DSM is created with a hierarchical decomposition. FIG. 15 shows the example of an initial hierarchy. The dependencies between various elements of the database are obtained in a variety of ways such as from the meta-data that is maintained by the database; from the parsing of SQL code; and, by manual specification. FIG. 13 shows the example of a resulting DSM. The figure also illustrates the default hierarchy and how dependencies are aggregated up the various levels of the hierarchy in accordance with the embodiment of this invention.

FIG. 10 shows the initial dialog that allows the user to create a DSM for the Oracle database. FIG. 11 shows a dialog box which allows the user to specify the schemata about which the dependency information is collected. FIG. 12 shows the options related to how "Synonyms" are processed for an Oracle database.

FIG. 13 shows the screen shot of LDM for an Oracle database. The vertical axis, 1310, shows the hierarchical decomposition for the database. The user can selectively expand or collapse any part of the hierarchic decomposition by positioning the cursor over the '+' or the '−' icon and clicking on the left mouse button. The selected cell 1320 shows the dependency of the subsystem XDB on CTXSYS.

The usage pane on the right, 1330, shows the dependencies associated with the selected cell, 1320, in the DSM. The figure shows that the package DBMS_XDBT in the schema XDB, 1340, depends on the three packages and 2 views in the CTXSYS schema, 1350. The Usage Tab is itself organized into two panes, a Used By pane and a Uses pane both of which are also organized as an expandable and collapsible tree.

Options for Processing Synonyms

Databases such as Oracle contain elements called "Synonyms". Synonyms are alternate names for database elements. Some Synonyms are "public" so that they can be referred to by many other parts of the database. Public Synonyms are considered part of the public schema. When many of the elements of the database refer to each other through public Synonyms, it becomes hard to group them together using DSM-Partitioning and DSM-Clustering algorithms. This is because in the DSM the elements of the database which refer to the public Synonym depend on them. The public Synonyms themselves depend on the database element that they are an alias for. As a result, the grouping of public Synonym into a public schema often leads to a subsystem which depends on a large number of subsystems and this subsystem in turn depends on a large number of subsystems. Such subsystems are called a "change propagators". In the presence of change propagators, DSM-Partitioning algorithms will yield a single grouping or a small number of groupings, thereby, defeating the purpose of extracting groupings of related elements.

FIG. 12 shows the options related to synonyms that have been provided in an embodiment of this invention. One option does not create a database element for the Synonym. For example, if Stored Procedure A depends on Table B through a Synonym, then the Stored Procedure A will have a direct dependency on Table B when this option is selected. On the other hand, if the option is selected to create a database element for the Synonym then user has two additional options to select from for public Synonyms: (1) The Synonym is moved to the schema which contains the database element that that Synonym depends on or (2) The synonym is put into a subsystem which contains all public synonyms.

Creating a DSM for Spring Framework Configuration Files

FIG. 14 shows the screen shot of LDM for a Spring Framework system. Here the initial hierarchy is created by grouping together all the Spring Beans and Java classes within each Spring Configuration File. The vertical axis 1410 shows the hierarchical decomposition for the Spring Configuration Files. Each of the Spring File contains Spring Beans and Java Classes. The user can selectively expand or collapse any part of the hierarchic decomposition by positioning the cursor over the '+' or the '−' icon and clicking on the left mouse button. ClientContext.xml 1420 contains Spring Beans 1430 and Java Classes 1440. The Java classes are in turn organized based on their package structure. LDM also provides an option to not display Java classes.

The selected cell 1450 shows the dependency of the Spring Bean, petStore on dataAccessContext-jta.xml. The usage pane on the right 1460 shows the dependencies with the selected cell 1450 in the DSM. The figure shows that the Spring Bean petStore depends on the Spring Beans accountDao, categoryDao, itemDao, orderDao, 1470 in dataAccessContext-jta.xml. The Usage Tab is itself organized into two panes, a Used By pane and a Uses pane both of which are also organized as an expandable and collapsible tree.

Creating Multi-Domain DSM

FIG. 16 is a block diagram of an embodiment of the present invention for multiple domains termed "Multi-LDM", computer application 1600. In Multi-LDM, the User Interface (UI) subsystem 1621 provides features for user interaction via a graphical windowing system, including, in certain cases, windows, menus, dialogs, and similar features.

Project subsystem 1622 provides business logic, data structures, and methods for the internal core of the Multi-LDM computer application 1600, including Dependency Extractor 1612 for generating the Atoms and Dependencies of the System 1607 being analyzed and provided with architecture management. The Project subsystem 1622 also includes System Partitioner 1617 for generating the Partitions 1620 and Rule Engine 1619 for creating, modifying, and evaluating Design Rules 1621.

The System 1607 being analyzed consists of one or more domains. The figure shows the system as consisting of three domains which are called Subsystem-Domain1 1601, Subsystem-Domain2 1602, and Subsystem-Domain3 1603.

Stored Project 1608 is the stored portion of the Project 1622, which is retained in non-volatile storage, such as hard disk, where Atoms & Dependencies 1604, Partitions 1605 and Design Rules 1606 are stored for ongoing use.

The Dependency Extractor 1616 contains a dependency extractor for each of the domains that are in the System 1607. Dependency Extractor-1 1609 extracts dependencies from Subsystem-Domain1 1601 and generates its Atoms & Dependencies-1 1613. Dependency Extractor-2 1610 extracts dependencies from Subsystem-Domain2 1602 and generates its Atoms & Dependencies-2 1614. Dependency Extractor-3 1611 extracts dependencies from Subsystem-Domain3 1603 and generates its Atoms & Dependencies-1 1615.

All of the Atoms & Dependencies 1616 are processed by the System Partitioner 1617 to generate the Partitions 1620 of the System. As used herein, partitions are equivalent to software subsystems. These Partitions 1620 are constructed from the Atoms 1616 and are organized in a hierarchy of partitions. The Merge Manager 1618, based on a user specified criteria, then merges many of the partitions together into a single partition. Each of the merged partitions now contains all the atoms that were in the partitions that were merged together. Typically, all partitions which contain atoms of the same name are merged together. Other merge criteria are possible as well that take atom name, type and properties into consideration.

Following initial dependency extraction of the System 1607, the user of Multi-LDM computer application 1600 may use the Rule Engine 1619 to define Design Rules 1621 for the System 1607. Design Rules 1621 are rules regarding permissible or asserted Dependency relationships between Partitions 1620. Rule Engine 1619 evaluates Design Rules 1621 and determines if any violations of the Design Rules 1621 exist between the Partitions 1620 and their relationships. The Rule Engine 1619 also provides methods for creating, modifying, and deleting the Design Rules 1619.

FIG. 17 provides a flow chart of information processing of the embodiment of the Multi-LDM computer application 1600. The Atoms and Dependencies for System 1607 are extracted using the Dependency Extractor 1612. System Partitioner 1617 partitions the Atoms and Dependencies 1616 and produces an in-memory representation of the Partitions 1620. The Merge Manager 1618 merges partitions based on user specified criteria. As mentioned previously, partitions are equivalent to software subsystems and Partitions 1620 contain information related to the subsystems of the System 1607 being analyzed and managed.

The Extract Dependencies 1710 process produces In Memory Atoms and Dependencies 1713. The Extract Dependencies 1710 process extracts dependencies by a combination of techniques that include parsing code, reading configuration files and querying databases. The Generate Partitions 1711 process takes the In Memory Atoms and Dependency 1713 and produces the In Memory Partitions 1714. The Merge Partitions Process 1712 takes in In Memory Partitions 1714 as input, merges some of the partitions and generates a new In Memory Partitions 1714. Partitions are merged together based on user specified criteria such as matching atom names, matching atom kinds or matching properties. From the In Memory Atoms and Dependencies 1713 and In Memory Partitions 1714, "Create Presentation for System Representation with Design Rules Applied" 1716 may create User Presentation 1718, which is the on-screen presentation of this information to the user. With creation of User Presentation 1718, the user of the Multi-LDM computer application 1600 may create In Memory Design Rules 1717, applicable to the In Memory Partitions 1714.

The user of Multi-LDM computer application 1600 may use Create/Modify Additional System Representation and Design Rules 1717 to augment In-Memory Partitions 1714 by partition editing operations such as creating new partitions, splitting partitions, aggregating partitions, deleting partitions, and renaming partitions. When Design Rules 1715 are created or modified by the process Create/Modify Additional System Representation and Design Rules 1717, Design Rules 1621 are initially stored in In-Memory Design Rules 1715. In-Memory Atoms and Dependencies 1713, In Memory Partitions 1714 and In-Memory Design Rules 1715 data may be written out to the stored versions of Atoms and Dependencies 1604, Partitions 1605 and Design Rules 1606.

Once stored as Stored Project 1608, Atoms & Dependencies 1604, Partitions 1605, and Design Rules 1606, In-Memory Atoms & Dependencies 1713, Partitions 1714 and Design Rules 1715 data may be read from the stored versions of Atoms & Dependencies 1604, Partitions 1605, and Design Rules 1606, rather than as a result of re-executing processes Extract Dependencies 1710, Generate Partitions 1711 and Merge Partitions 1712.

An example of a multi-domain system is one that been implemented utilizing Java and Spring Framework. In this case, the atoms generated from the Spring Framework configuration files will include Spring Beans and Java classes; and, atoms generated from Java file will include Java classes. Based on user criterion that matches atom names, the merge manager will merge together leaf partitions that contain atoms of the same name. The resulting DSM will now show how the Spring Beans and Java classes are related to each other.

Another example of a multi-domain system is one that utilizes Java, Oracle and Hibernate. In the case, the atoms generated from the Java domain will include Java classes and interfaces; the atoms generated from Oracle will include schemata, tables and views; and the atoms generated from Hibernate will include Java classes and Oracle schemata, tables and views. When the partitions are merged together there will be partitions for Java classes and interfaces that include atoms from both Java domain and Hibernate domains. Similarly there will be partitions for Oracle elements such as schemata, tables and views that include atoms from both Oracle and Hibernate domains. Since the atoms from the Hibernate domain have dependencies between each other, the resulting DSM will show partitions for Java classes with dependencies on Oracle schemata, tables and views. The Hibernate domain in this case maps the Java domain and the Oracle domain.

Examples of multiple domains are not limited to different parts of the system. Each domain will have different dependency extractors to extract different types of dependencies from the same parts of the system. After merger, the Multi-Domain DSM will show dependencies between subsystems where the dependencies were extracted by different dependency extractors.

Impact Analysis—Creating DSMs for Subsets of Elements

It can be useful to display smaller subsets of large DSMs particularly those where the matrix is sparse. This is useful when a user desires to see the elements which could be impacted by change.

FIG. 20 is an illustration of an embodiment of the present invention providing marking of a subsystem as changed in order to assist in understanding the impact of the change. Marking of elements in a DSM can be accomplished in a variety of ways. A user may manually mark an element in the initial DSM using the UI provided in LDM computer application 800. An element may also be marked by a scheme which uses a property of the element or metadata that has been previously assigned to the element.

In the embodiment of FIG. 20, there is implemented a scheme by which elements impacted by change are displayed and marked.

1. The elements being changed are marked and added to the display set.
2. For all marked elements, the embodiment computes all the elements that use these marked elements. These new elements are added to the display set; marks from the elements that are currently marked are removed; and the new elements just added to the display set are in turn marked.
3. Repeat step 2 until no new elements are added to the display set.

The display set now contains elements that either directly or indirectly depend on marked elements. A new DSM is displayed with only the elements in the display set. All other elements are hidden. This DSM contains all the elements that are related to the initial set of elements that are being changed. In an alternate implementation, the display set is constructed based on only the elements that the marked elements use.

FIG. 20 shows a DSM where the subsystem "Principal" has been marked as changed. The figure also shows a pull down box where "Uses/UsedBy" is being selected. Once that selection is made, the DSM will be reduced to show only the elements that either use or are used by "Principal". The UsedBy elements are those that are directly or indirectly dependent on "Principal" while the Uses elements are those that "Principal" depends on either directly or indirectly. FIGS. 21, 22 and 23 show DSMs where the subsystems "Log 4j Listener" and "RegexpMatcherFactory" are marked as changed. FIG. 21 shows a DSM that includes only subsystems that "Log 4jListener" and "RegexpMatcherFactory" depend on directly or indirectly. FIG. 22 shows a DSM that includes only subsystems that directly or indirectly depend on "Log 4jListener" and "RegexpMatcherFactory". FIG. 39 shows a DSM that includes elements from both the DSMs in FIGS. 21 and 22.

The described embodiments of the invention are intended to be merely exemplary and numerous variations and modifications will be apparent to those skilled in the art. All such variations and modifications are intended to be within the scope of the present invention.

What is claimed is:

1. A method for managing, in a computer system, design of a database system, the database system having a set of schemata, the method comprising:
   in a first computer process, extracting dependencies from the database system and identifying the set of schemata;
   for each specific schema in the set of schemata, creating in a second computer process a partition that, in turn, contains a further partition for each element of the specific schema, so as to establish a hierarchy of partitions in accordance with the structure of the set of schemata;
   storing a representation of the database system including subsystems, dependency relationships among the subsystems, and the hierarchy of partitions; and
   providing a graphical output from the computer system, based on the stored representation, in which appears a display of the hierarchy of partitions within a dependency structure matrix, such matrix graphically indicating the dependency relationships among subsystems.

2. The method according to claim 1, wherein creating the partition in the second computer process includes creating the partition for a database table, the partition for the database table containing partitions for columns of the database table and partitions for all indices of the database table.

3. The method according to claim 1, wherein the hierarchy of partitions within the dependency structure matrix is selectively expandable and collapsible.

4. The method according to claim 3, wherein, in an instance when a given parent subsystem has been expanded to show its hierarchical children, dependencies are shown for such hierarchical children but not for such parent subsystem.

5. The method according to claim 4, where a relationship of such hierarchical children to such parent subsystem is shown by placing the parent subsystem sidewise alongside such children.

6. The method according to claim 1, further comprising:
   in response to a graphical user input that alters the hierarchy of partitions displayed in the dependency structure matrix, automatically altering the dependency relationships among the subsystems to be consistent therewith, and updating the stored representation of the subsystems and dependency relationships among the subsystems.

7. The method according to claim 6, wherein the graphical user input includes moving a subsystem from one location to another, and automatically altering the dependency relationships includes operating in a manner so as to preserve dependencies of subsystems affected by the alteration.

8. The method according to claim 6, wherein the graphical user input includes removing a subsystem, and automatically altering the dependency relationships includes operating in a manner so as to cause removal of dependencies of the removed subsystem.

9. The method according to claim 6, wherein the graphical user input includes adding a subsystem, and automatically altering the dependency relationships includes operating in a manner so as to preserve the dependencies of the added subsystem.

10. The method according to claim 1, wherein storing a representation of the database system includes causing elements, of the database system, that are public synonyms for other elements of the database system to be excluded from the stored representation.

11. The method according to claim 1, wherein storing a representation of the database system includes causing an element, of the database system, that is a public synonym for other elements of the database system to be placed within a partition that represents a schema containing an element upon which that synonym depends.

12. The method according to claim 1, wherein storing a representation of the database system includes causing an element, of the database system, that is a public synonym for other elements of the database system to be placed within a subsystem containing all public synonyms.

* * * * *